(12) United States Patent
Suzuki et al.

(10) Patent No.: US 9,108,680 B2
(45) Date of Patent: Aug. 18, 2015

(54) AUTOMOBILE CHASSIS FRAME STRUCTURE

(75) Inventors: Youichirou Suzuki, Saitama (JP); Yoshikatsu Ohta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/003,641

(22) PCT Filed: Feb. 10, 2012

(86) PCT No.: PCT/JP2012/053087
§ 371 (c)(1),
(2), (4) Date: Nov. 5, 2013

(87) PCT Pub. No.: WO2012/120967
PCT Pub. Date: Sep. 13, 2012

(65) Prior Publication Data
US 2014/0084634 A1  Mar. 27, 2014

(30) Foreign Application Priority Data

Mar. 10, 2011 (JP) ................................ 2011-052515
Mar. 10, 2011 (JP) ................................ 2011-052516

(51) Int. Cl.
*B60K 37/00* (2006.01)
*B62D 25/08* (2006.01)
(Continued)

(52) U.S. Cl.
CPC .............. *B62D 25/08* (2013.01); *B62D 21/152* (2013.01); *B62D 25/082* (2013.01); *B62D 25/2018* (2013.01)

(58) Field of Classification Search
CPC ...... B60R 9/06; B60G 2204/148; B60K 5/04; Y10S 224/924; Y10S 414/134; A46B 5/0025; A63B 22/001; B60N 2/181; B62B 2205/10; B62B 7/044
USPC ..................................... 296/205, 204; 72/705
See application file for complete search history.

(56) References Cited

U.S. PATENT DOCUMENTS 3,129,954 A * 4/1964 Duero et al. ................... 280/792
3,264,010 A * 8/1966 Pierce ........................... 280/792
(Continued)

FOREIGN PATENT DOCUMENTS

JP        H03-501009 A    3/1991
JP        H06-32246 A     2/1994
(Continued)

*Primary Examiner* — Kiran B Patel
(74) *Attorney, Agent, or Firm* — Carrier Blackman & Associates, P.C.; William D. Blackman; Joseph P. Carrier

(57) ABSTRACT

A first and second pipe materials forming a front side frame are arranged in an up-and-down direction in a first horizontal portion, in a left-and-right direction in a second horizontal portion, and replaced from the up-and-down direction to the left-and-right direction in an inclined portion between the first horizontal portion and the second horizontal portion, and at least in the first horizontal portion and the second horizontal portion, the first and second pipe materials are welded to each other by welds, and therefore, it becomes possible to change in the longitudinal direction the cross-sectional shape or bending stiffness of the front side frame formed by joining the first and second pipe materials without changing the cross-sectional shapes thereof in the longitudinal direction, thus providing the front side frame that has a light weight but has excellent impact absorption performance at the time of a collision.

28 Claims, 17 Drawing Sheets

(51) Int. Cl.
*B62D 21/15* (2006.01)
*B62D 25/20* (2006.01)

(56) References Cited

U.S. PATENT DOCUMENTS

| | | | | |
|---|---|---|---|---|
| 4,899,843 A * | 2/1990 | Takano et al. | | 180/312 |
| 4,986,597 A * | 1/1991 | Clausen | | 296/205 |
| 5,201,566 A * | 4/1993 | Mori | | 296/192 |
| 5,213,386 A * | 5/1993 | Janotik et al. | | 296/29 |
| 5,269,585 A * | 12/1993 | Klages et al. | | 296/205 |
| 5,332,281 A * | 7/1994 | Janotik et al. | | 296/209 |
| 5,338,080 A * | 8/1994 | Janotik et al. | | 296/29 |
| 5,549,352 A * | 8/1996 | Janotik et al. | | 296/209 |
| 5,839,776 A * | 11/1998 | Clausen et al. | | 296/187.03 |
| 5,839,777 A * | 11/1998 | Vlahovic | | 296/205 |
| 6,022,070 A * | 2/2000 | Ashina et al. | | 296/205 |
| 6,029,353 A * | 2/2000 | Cowan | | 29/897.312 |
| 6,209,948 B1 | 4/2001 | Mori et al. | | |
| 6,623,067 B2 * | 9/2003 | Gabbianelli et al. | | 296/205 |
| 7,036,874 B2 * | 5/2006 | Stojkovic et al. | | 296/193.09 |
| 7,273,247 B2 * | 9/2007 | Grueneklee et al. | | 296/205 |
| 7,441,830 B2 * | 10/2008 | Caliskan et al. | | 296/204 |
| 7,488,022 B2 * | 2/2009 | Belwafa et al. | | 296/29 |
| 7,562,905 B2 * | 7/2009 | Ruste | | 280/796 |
| 7,758,107 B2 * | 7/2010 | Ratsos et al. | | 296/203.03 |
| 7,871,123 B2 * | 1/2011 | Stojkovic et al. | | 296/193.09 |
| 8,052,202 B2 * | 11/2011 | Nakamura | | 296/190.08 |
| 8,162,388 B2 * | 4/2012 | Balzer et al. | | 296/203.03 |
| 8,201,873 B2 | 6/2012 | Nishimura et al. | | |
| 8,459,728 B2 * | 6/2013 | Fujii et al. | | 296/203.02 |
| 8,469,132 B2 * | 6/2013 | Noichi | | 180/219 |
| 2006/0283650 A1 * | 12/2006 | Kawamura et al. | | 180/227 |
| 2008/0203768 A1 * | 8/2008 | Lowe | | 296/205 |
| 2008/0224502 A1 * | 9/2008 | Miki | | 296/203.02 |
| 2014/0015280 A1 * | 1/2014 | Ohta | | 296/187.08 |
| 2014/0035325 A1 * | 2/2014 | Naito et al. | | 296/203.02 |
| 2014/0084634 A1 * | 3/2014 | Suzuki et al. | | 296/205 |
| 2014/0232138 A1 * | 8/2014 | Kanaguichi et al. | | 296/187.12 |

FOREIGN PATENT DOCUMENTS

| | | |
|---|---|---|
| JP | H10-95364 A | 4/1998 |
| JP | 2004-203328 A | 7/2004 |
| JP | 2005-532207 A | 10/2005 |
| JP | 2007-302127 A | 11/2007 |
| JP | 2008-143194 A | 6/2008 |
| JP | 2009-083748 A | 4/2009 |
| JP | 2009-096330 A | 5/2009 |
| JP | 2009-280006 A | 12/2009 |
| JP | 2011-037289 A | 2/2011 |
| WO | 97/29005 A1 | 8/1997 |

* cited by examiner

FIG.13
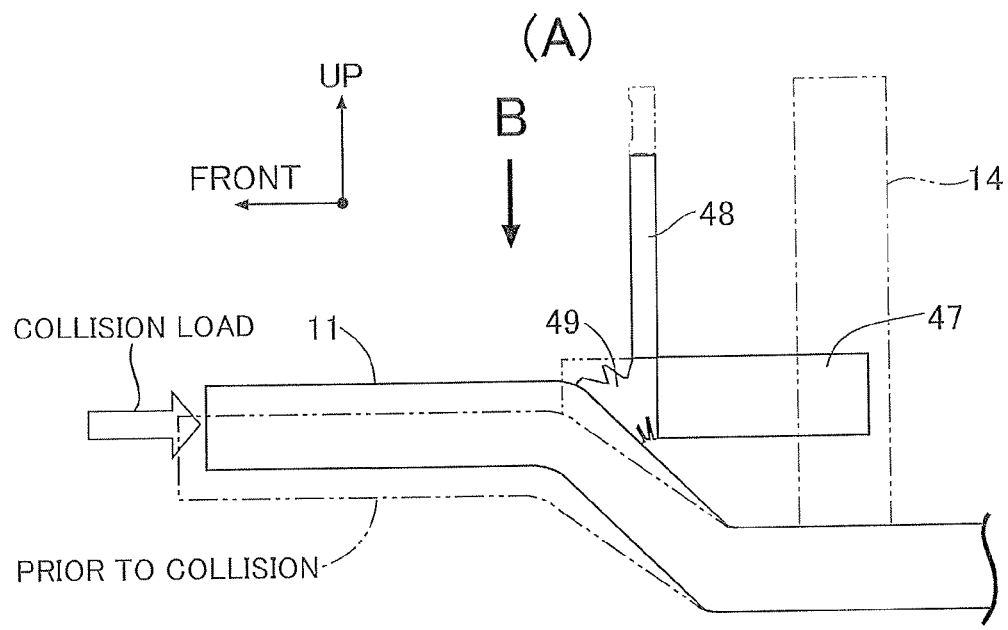
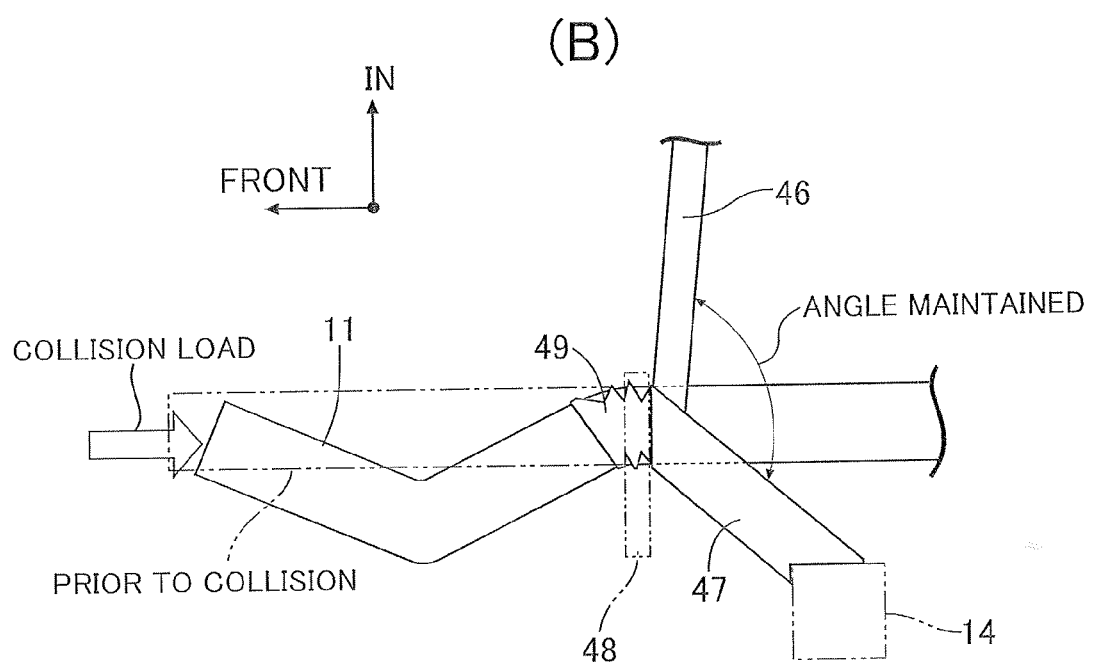

AUTOMOBILE CHASSIS FRAME STRUCTURE

TECHNICAL FIELD

The present invention relates to an automobile chassis frame structure in which a plurality of pipe materials are arranged and joined to each other to thus form a frame member.

BACKGROUND ART

An arrangement in which two hollow cross section members in which a front linear portion and a rear linear portion are connected via an intermediate bent portion are joined by vertically superimposing the front linear portions, to thus form a Y-shaped frame member in which two rear linear portions are branched from one front linear portion, is known from Patent Document 1 below.

RELATED ART DOCUMENTS

Patent Documents

Patent Document 1: Published Japanese Translation No. 2005-532207 of a PCT Application

DISCLOSURE OF INVENTION

Problems to be Solved by the Invention

A front side frame supporting an automobile power plant formed from an engine and a transmission is required, when the automobile is involved in a frontal collision, to have a function of minimizing deformation of a passenger compartment by bending into a predetermined shape to thus absorb the impact. In order to do so, it is necessary to change the cross-sectional shape or strength distribution along the longitudinal direction of the front side frame, but such a front side frame has the problem that the number of components greatly increases. On the other hand, when a pipe material having a constant cross section is bent into a predetermined shape to form a front side frame, although the number of components or the weight thereof can be reduced, since the cross-sectional shape or strength distribution cannot be changed along the longitudinal direction, it is difficult for a sufficient impact absorption performance to be exhibited when the automobile is involved in a frontal collision.

The present invention has been accomplished in light of the above circumstances, and it is an object thereof to provide an automobile chassis frame structure in which the cross-sectional shape or strength distribution can be changed along the longitudinal direction with a simple structure involving merely combining a plurality of pipe materials.

Means for Solving the Problems

In order to attain the above object, according to a first aspect, there is provided an automobile chassis frame structure comprising a plurality of pipe materials arranged and joined to each other to thus form a frame member, wherein in a first portion on one end side of the frame member the plurality of pipe materials are arranged in a first direction, in a second portion on the other end side of the frame member the plurality of pipe materials are arranged in a second direction that is different from the first direction, and in a third portion sandwiched by the first and second portions of the frame member the arrangement of the plurality of pipe materials is changed from the first direction to the second direction, and the plurality of pipe materials are joined to each other in at least the first and second portions.

Further, according to a second aspect of the present invention, in addition to the first aspect, the plurality of pipe materials comprise in one portion in a longitudinal direction a changed strength portion that has a strength different from other portions, and the positions of the changed strength portions coincide with each other in a longitudinal direction of the frame member.

Furthermore, according to a third aspect of the present invention, in addition to the first aspect, at a predetermined position in a longitudinal direction of the frame member, only some pipe materials of the plurality of pipe materials comprise in one portion in a longitudinal direction a changed strength portion that has a strength different from other portions.

Moreover, according to a fourth aspect of the present invention, in addition to the first aspect, at least two pipe materials of the plurality of pipe materials comprise in one portion in a longitudinal direction a changed strength portion that has a strength different from other portions, and the changed strength portions of the two pipe materials have different positions in a longitudinal direction of the frame member.

Further, according to a fifth aspect of the present invention, in addition to any one of the first to fourth aspects, the plurality of pipe materials are welded at predetermined pitches, and the pitches for welding are nonuniform in the longitudinal direction of the frame member.

Furthermore, according to a sixth aspect of the present invention, in addition to the fifth aspect, the frame member comprises a plurality of weld lines, and the welding pitches of the plurality of weld lines are not coincident with each other.

Moreover, according to a seventh aspect of the present invention, in addition to any one of the first to sixth aspects, in the first portion or the second portion a groove-shaped bead is formed in one of mating faces of at least two of the pipe materials, and the bead opens on an outer surface of the frame member in the third portion.

Further, according to an eighth aspect of the present invention, in addition to the seventh aspect, of the mating faces of the two pipe materials superimposed in the vertical direction, the bead is formed in a lower face of the upper-side pipe material.

Furthermore, according to a ninth aspect of the present invention, in addition to the seventh or eighth aspect, an interior of the bead facing the mating face is filled with a rustproofing agent.

Moreover, according to a tenth aspect of the present invention, in addition to any one of the seventh to ninth aspects, a groove-shaped bead is formed in one of mating faces of the two pipe materials, and an opening opposing the bead is formed in the other mating face.

Further, according to an eleventh aspect of the present invention, in addition to the first aspect, the third portion is an inclined portion that is sandwiched between the first and second portions of a front side frame, which is the frame member, and is inclined downwardly to the rear, and the structure comprises a first linking member that has opposite ends in the vehicle width direction connected to a linking part provided on the inclined portion, a second linking member that extends rearwardly from the linking part and is connected to a front pillar lower, and a third linking member that extends upwardly from the linking part and is connected to another frame member.

Furthermore, according to a twelfth aspect of the present invention, in addition to the eleventh aspect, the second and third linking members are linked to the linking part via a joining member that is weaker than the second and third linking members.

Moreover, according to a thirteenth aspect of the present invention, in addition to the eleventh or twelfth aspect, the other frame member comprises left and right wheel house upper members that extend in a fore-and-aft direction on an outer side in a vehicle width direction of the front side frame.

Further, according to a fourteenth aspect of the present invention, in addition to the eleventh or twelfth aspect, the other frame member comprises left and right wheel house upper members that extend in a fore-and-aft direction on an outer side in a vehicle width direction of the front side frame or a dashboard upper cross member that links the left and right front pillar lowers.

Furthermore, according to a fifteenth aspect of the present invention, in addition to the eleventh or twelfth aspect, the other frame member comprises the front pillar lower.

Moreover, according to a sixteenth aspect of the present invention, in addition to any one of the eleventh to fifteenth aspects, the first and second linking members are formed so as to have a closed cross-section by joining a sheet metal pressed material to a dashboard lower, and the third linking member is formed from a pipe material.

Further, according to a seventeenth aspect of the present invention, in addition to any one of the eleventh to sixteenth aspects, the first linking member extends from the linking part inwardly in the vehicle width direction, and the second linking member and the third linking member extend from the linking part outwardly in the vehicle width direction.

Furthermore, according to an eighteenth aspect of the present invention, in addition to any one of the eleventh to seventeenth aspects, the inclined portion of the front side frame has a weak portion at a position in front of the linking part, the weak portion being locally weakened.

A front side frame 11 of an embodiment corresponds to the frame member of the present invention, a first horizontal portion 11a of the embodiment corresponds to the first portion of the present invention, a second horizontal portion 11b of the embodiment corresponds to the second portion of the present invention, an inclined portion 11c of the embodiment corresponds to the third portion of the present invention, a front-side weak portion 11d and a rear-side weak portion 11e of the embodiment correspond to the weak portion of the present invention, a wheel house upper member 12, a front pillar lower 14, and a dashboard upper cross member 18 of the embodiment correspond to the other frame member of the present invention, first and second pipe materials 31 and 32 of the embodiment correspond to the pipe material of the present invention, weak portions 31c and 32c of the embodiment correspond to the changed strength portion of the present invention, and a first weld line L1 and a second weld line L2 correspond to the weld line of the present invention.

Effects of the Invention

In accordance with the first aspect of the present invention, since in the first portion on one end side of the frame member of the chassis frame the plurality of pipe materials are arranged in the first direction, in the second portion on the other end side of the frame member the plurality of pipe materials are arranged in the second direction that is different from the first direction, in the third portion sandwiched between the first and second portions of the frame member the arrangement of the plurality of pipe materials is changed from the first direction to the second direction, and at least in the first and second portions the plurality of pipe materials are joined to each other, it becomes possible to change in the longitudinal direction the cross-sectional shape or bending stiffness of the frame member formed by joining the pipe materials without changing the cross-sectional shapes thereof in the longitudinal direction, thus providing a frame member that is inexpensive but has excellent impact absorption performance at the time of a collision. Moreover, since the plurality of pipe materials are joined, it is possible to prevent the two pipe materials from deforming so as to expand mating faces when a bending moment acts thereon, thus improving the bending stiffness of the chassis frame.

Furthermore, in accordance with the second aspect of the present invention, since the plurality of pipe materials include in one portion in the longitudinal direction a changed strength portion that has a different strength from that of the other portion, and the positions of the changed strength portions thereof coincide with each other in the longitudinal direction of the frame member, allowing or suppressing bending of the frame member at the changed strength portions enables the frame member to be deformed into a desired shape when a collision load is inputted.

Moreover, in accordance with the third aspect of the present invention, since at a predetermined position in the longitudinal direction of the frame member only some pipe materials of the plurality of pipe materials include in a portion in the longitudinal direction a changed strength portion that has a different strength from that of other portions, it is possible to freely control the bending mode of the frame member by means of the changed strength portions.

Furthermore, in accordance with the fourth aspect of the present invention, since at least two pipe materials of the plurality of pipe materials include in one portion in the longitudinal direction a changed strength portion that has a different strength from that of other portions, and the positions of the changed strength portions of the two pipe materials are different in the longitudinal direction of the frame member, it is possible to freely control the bending mode of the frame member by means of the changed strength portions.

Moreover, in accordance with the fifth aspect of the present invention, since the plurality of pipe materials are welded at a predetermined pitch, and the welding pitch is nonuniform in the longitudinal direction of the frame member, it is possible to control the bending mode of the frame member by disposing a weak portion where the welding pitch is large and a strong portion where the welding pitch is small in the longitudinal direction of the frame member.

Furthermore, in accordance with the sixth aspect of the present invention, since the frame member includes a plurality of weld lines, and the welding pitches of the plurality of weld lines are not coincident with each other, it is possible to freely control the bending mode of the frame member by disposing a weak portion where the welding pitch is large and a strong portion where the welding pitch is small in the peripheral direction of the frame member.

Moreover, in accordance with the seventh aspect of the present invention, since in the first portion or the second portion the groove-shaped bead is formed in one of the mating faces of at least two pipe materials, it is possible to enhance the stiffness of the pipe material by means of the bead. Since the bead opens on the outer surface of the frame member in the third portion, it is possible to make an electrodeposition coating liquid flow into the interior of the bead via the opening.

Furthermore, in accordance with the eighth aspect of the present invention, since the bead is formed in the lower face of the upper-side pipe material among the mating faces of the two pipe materials superimposed in the vertical direction, it is possible to make it difficult for water to build up in the interior of the bead, thus preventing the occurrence of rust.

Moreover, in accordance with the ninth aspect of the present invention, since the interior of the bead facing the mating face is filled with a rustproofing agent, it is possible to prevent water from building up in the interior of the bead to cause rusting.

Furthermore, in accordance with the tenth aspect of the present invention, since the groove-shaped bead is formed in one of the mating faces of the two pipe materials, and the opening opposing the bead is formed in the other, it is possible to make an electrodeposition coating liquid flow into the bead of the one pipe through the opening from the interior of the other pipe material, thus spreading the electrodeposition coating liquid to every corner.

Moreover, in accordance with the eleventh aspect of the present invention, opposite ends in the vehicle width direction of the first linking member are connected to the linking part provided on the inclined portion, which is the third portion sandwiched between the first and second portions of the front side frame as the frame member and is inclined downwardly to the rear, the second linking member extending rearwardly from the linking part is connected to the front pillar lower, and the third linking member extending upwardly from the linking part is connected to the other frame member; when a front part of the front side frame attempts to bend upwardly with the rear end of the inclined portion of the front side frame as the center because of a collision load inputted from the front, the first and second linking members generate a forward reaction force, the third linking member generates a downward reaction force, and it thus becomes possible to reduce the bending moment acting on the front side frame, thereby enabling the weight of the front side frame to be lightened by an amount corresponding thereto.

Furthermore, since the vertical bending moment acting on the first and second linking members can be reduced by a downward reaction force generated by the third linking member, it becomes possible for the first to third linking member to transmit a load with as much axial force as possible, thereby minimizing any increase in weight by reducing the weight of the first to third linking members.

Moreover, in accordance with the twelfth aspect of the present invention, since the second and third linking members are linked to the linking part via the joining member, which is weaker than themselves, it is possible by absorbing a collision load inputted into the front side frame by means of crumpling of the joining member to prevent the angles of the second and third linking members from being changed, thus preventing the bending moment acting on the front side frame from increasing.

Moreover, in accordance with the thirteenth aspect of the present invention, since the other frame member to which the third linking member is connected is left and right wheel house upper members extending in the fore-and-aft direction on the outer side in the vehicle width direction of the front side frame, it is possible to transmit a collision load inputted into the front side frame to the wheel house upper member via the third linking member.

Furthermore, in accordance with the fourteenth aspect of the present invention, since the other frame member to which the third linking member is connected is left and right wheel house upper members extending in the fore-and-aft direction on the outer side in the vehicle width direction of the front side frame or a dashboard upper cross member linking the left and right front pillar lowers, it is possible to transmit a collision load inputted into the front side frame to the dashboard upper cross member via the third linking member.

Moreover, in accordance with the fifteenth aspect of the present invention, since the other frame member to which the third linking member is connected is a front pillar lower, it is possible to transmit a collision load inputted into the front side frame to the front pillar lower via the third linking member.

Furthermore, in accordance with the sixteenth aspect of the present invention, since the first and second linking members are formed so as to have a closed cross-section by joining the sheet metal pressed material to the dashboard lower, it is possible to ensure that there is a necessary stiffness of the first and second linking members while reducing the weight thereof and, furthermore, since the third linking member is formed from a pipe material, an axial force acting on the third linking member can be supported by a light-weight pipe material, thereby cutting the weight of the entire chassis frame.

Moreover, in accordance with the seventeenth aspect of the present invention, since the first linking member extends from the linking part inwardly in the vehicle width direction and the second linking member and the third linking member extend from the linking part outwardly in the vehicle width direction, it is possible to prevent the front side frame from bending in the vehicle width direction to the rear of the linking part to which the first to third linking members are linked when a collision load is inputted.

Furthermore, in accordance with the eighteenth aspect of the present invention, since the inclined portion of the front side frame has a weak portion that is locally weakened at a position to the front of the linking part, it is possible by bending the front side frame via the weak portion when the vehicle is involved in a frontal collision to prevent the angles formed between the first to third linking members from changing, thereby preventing the bending moment applied to the front side frame from increasing.

BRIEF DESCRIPTION OF DRAWINGS

FIG. 13 is a diagram for explaining the operation when in a collision. (sixth embodiment)

EXPLANATION OF REFERENCE NUMERALS AND SYMBOLS

Figure 1:
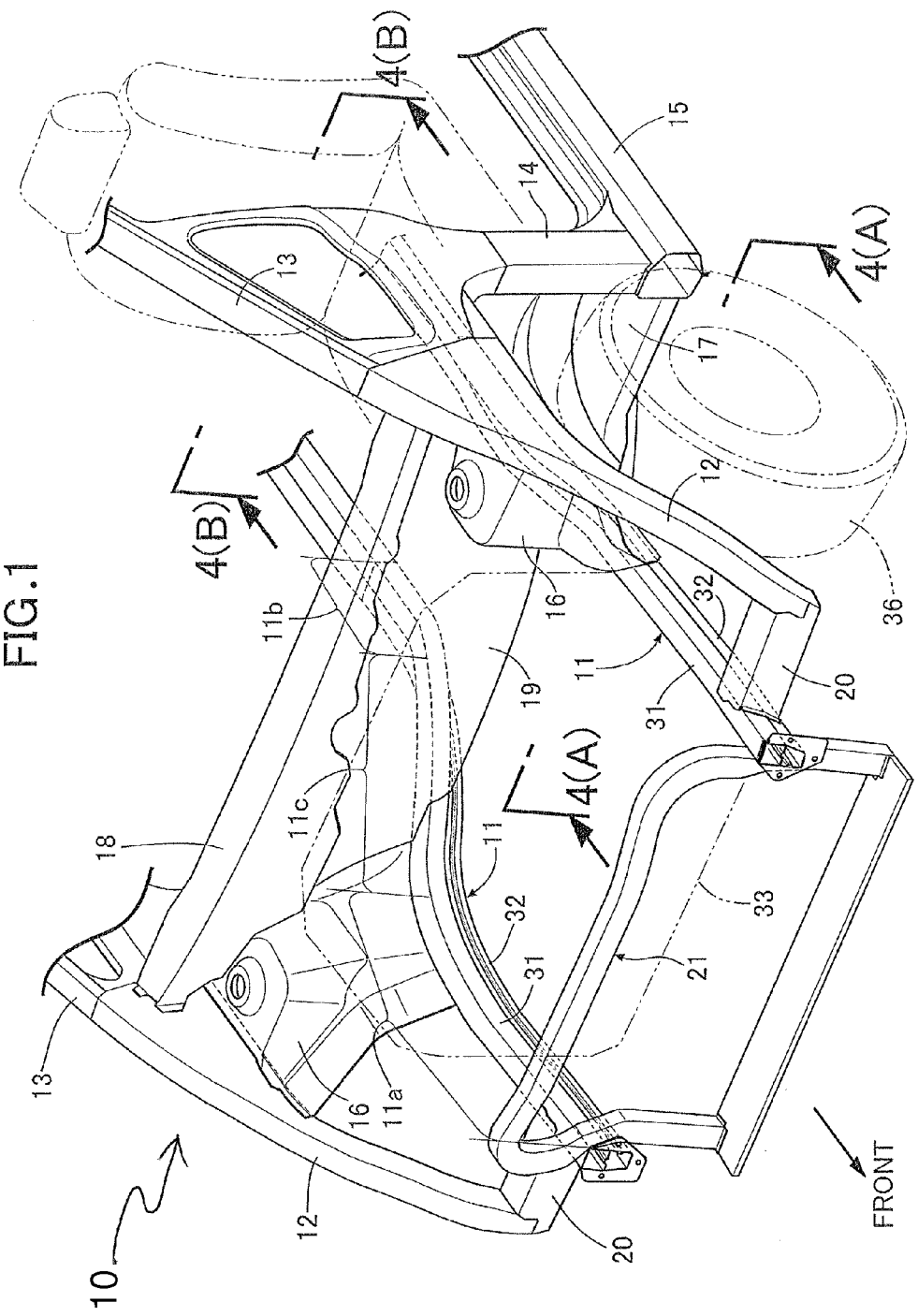
FIG. 1 is a perspective view showing a frame structure of a front part of an automobile chassis. (first embodiment)

11 Front side frame (frame member)
11a First horizontal portion (first portion)
11b Second horizontal portion (second portion)
11c Inclined portion (third portion)
11d Front-side weak portion (weak portion)
11e Rear-side weak portion (weak portion)
12 Wheel house upper member (other frame member)
14 Front pillar lower (other frame member)
18 Dashboard upper cross member (other frame member)
19 Dashboard lower
31 First pipe material (pipe material)
31a Bead
31b Opening
31c Weak portion (changed strength portion)
32 Second pipe material (pipe material)
32a Bead
32b Opening
32c Weak portion (changed strength portion)
35 Rustproofing agent
46 First linking member
47 Second linking member
48 Third linking member
49 Joining member
c Linking part
L1 First weld line (weld line)
L2 Second weld line (weld line)

MODES FOR CARRYING OUT THE INVENTION

Modes for carrying out the present invention are explained below by reference to the attached drawings.

First Embodiment

A first embodiment of the present invention is explained below by reference to FIG. 1 to FIG. 4. The fore-and-aft direction, the left-and-right direction (vehicle width direction), and the vertical direction referred to in the present specification are defined on the basis of an occupant seated on a driver's seat.

FIG. 1 is a perspective view showing a frame structure 10 of a front part of an automobile chassis. It will be understood that this frame structure 10 is part of a vehicle body frame, which is a component part of a vehicle. As shown in FIG. 1, a pair of left and right front side frames 11 and 11, for supporting a power plant 33 (also referred to as a power unit) integrally including an engine and a transmission, are disposed extending in the fore-and-aft direction, with front parts thereof extending longitudinally in a substantially horizontal direction, and rear parts thereof bending downwardly and inwardly in the vehicle width direction, and then extending longitudinally again in a substantially horizontal direction along a lower face of a floor panel, which is not illustrated.

A pair of left and right wheel house upper members 12 and 12 disposed on the outer side in the vehicle width direction of the left and right front side frames 11 and 11 are disposed so as to be inclined downwardly from the rear to the front, front parts of a pair of left and right front pillar uppers 13 and 13 are connected to rear parts of the wheel house upper members 12 and 12, and lower ends of a pair of left and right front pillar lowers 14 and 14 extending downwardly from lower parts of the front pillar uppers 13 and 13 are connected to front ends of a pair of left and right side sills 15 and 15 disposed in the fore-and-aft direction.

The rear parts of the wheel house upper members 12 and 12 and the front side frames 11 and 11 are connected via damper housings 16 and 16, and the front ends of the side sills 15 and 15 and the front side frames 11 and 11 are connected via outriggers 17 and 17. Furthermore, the left and right front pillar uppers 13 and 13 are connected via a dashboard upper cross member 18 extending in the left-and-right direction, and the left and right damper housings 16 and 16 and the left and right front side frames 11 and 11 are connected via a dashboard lower 19 extending in the left-and-right direction. Furthermore, front parts of the left and right front side frames 11 and 11 and front ends of the wheel house upper members 12 and 12 are connected via a pair of left and right side frame gussets 20 and 20 extending in the left-and-right direction. A rectangular frame-shaped front bulkhead 21 is supported between front ends of the left and right front side frames 11 and 11.

Figure 2:
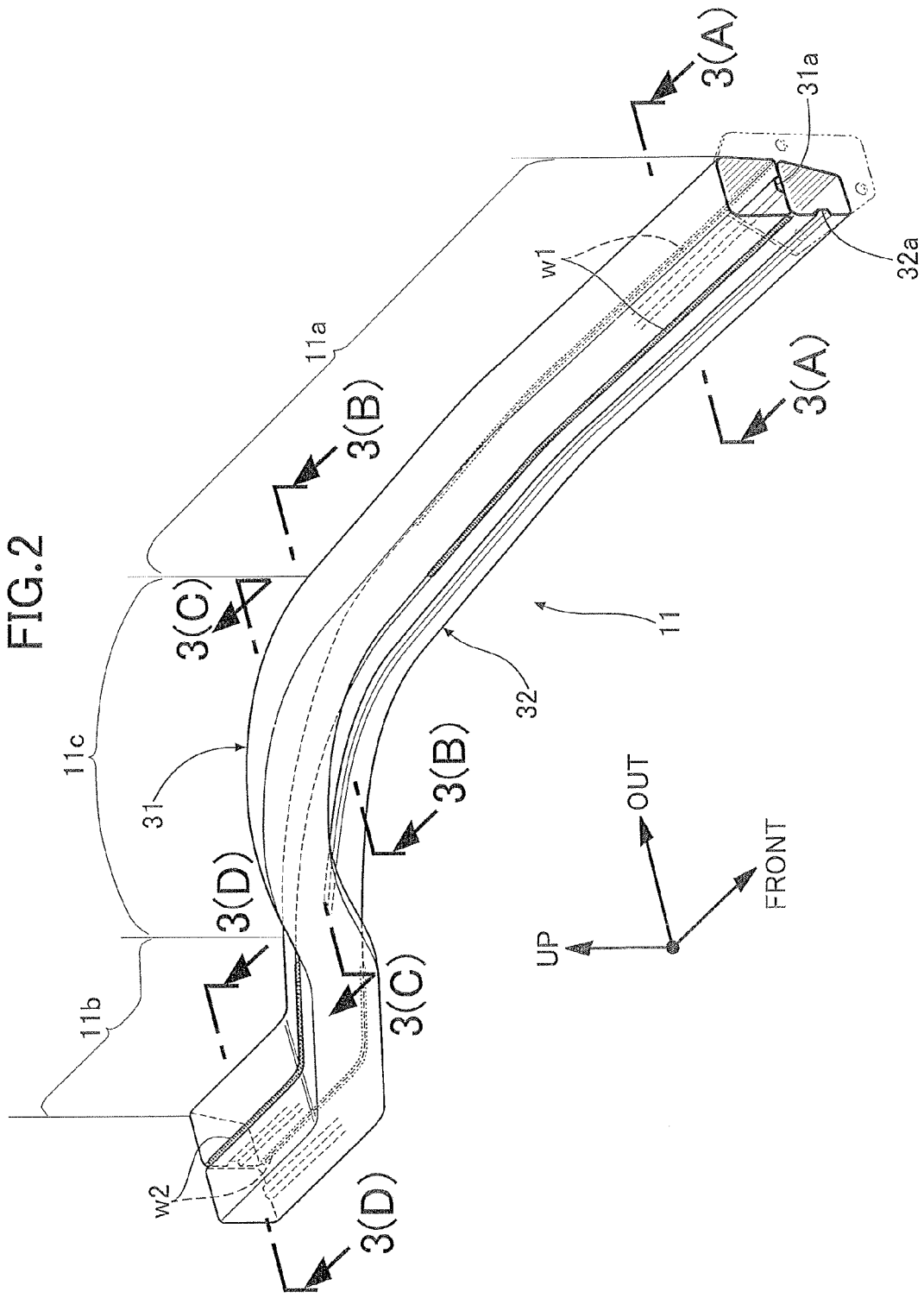
FIG. 2 is a perspective view of a front side frame. (first embodiment)
Figure 3:
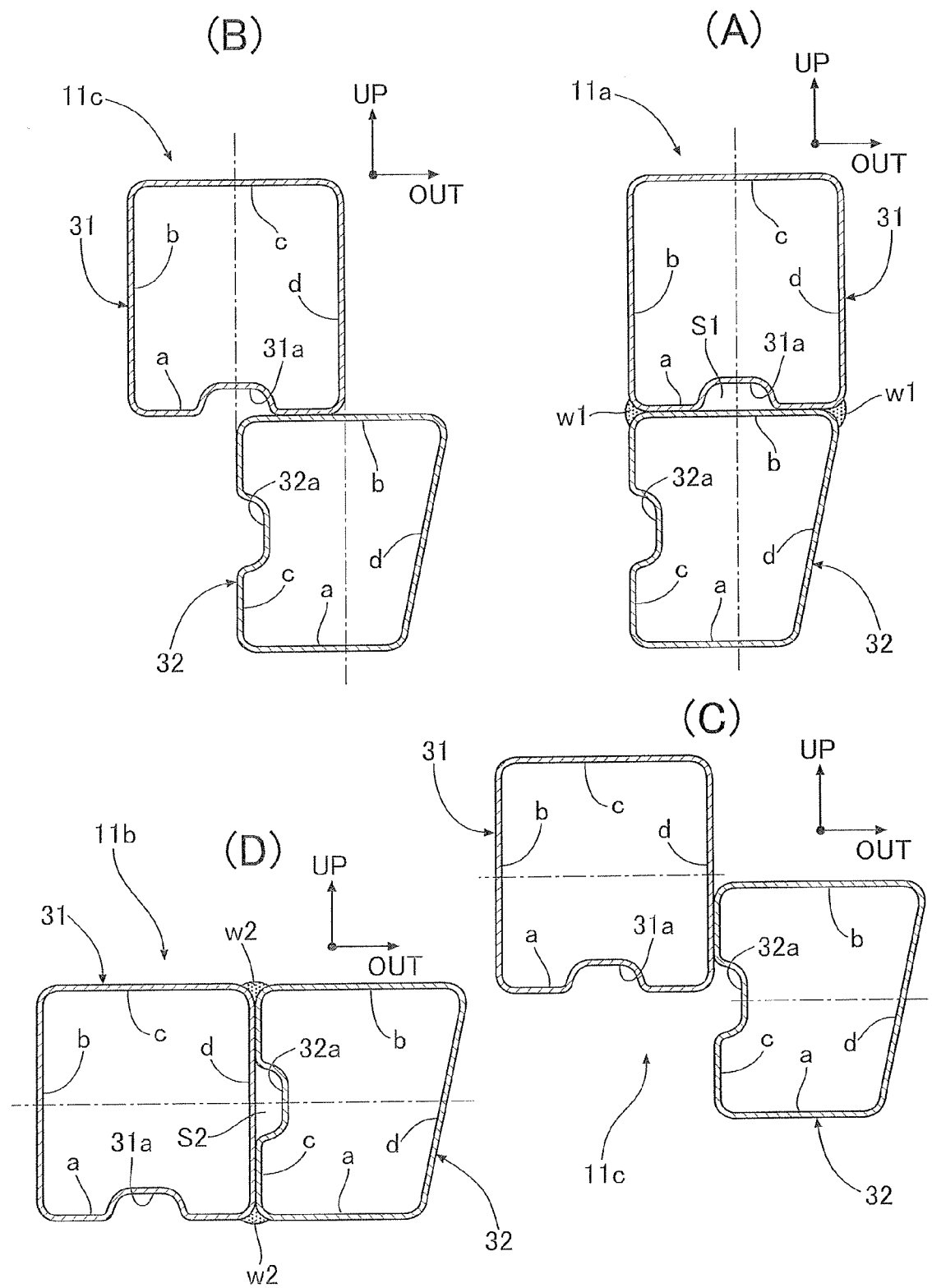
FIG. 3 is a sectional view along line 3(A)-3(A) and line 3(D)-3(D) in FIG. 2. (first embodiment)

FIG. 2 and FIG. 3 show the left front side frame 11, this front side frame 11 being formed by arranging a first pipe material 31 and a second pipe material 32, which are formed from a steel tube formed by roll-forming, etc., and joining them integrally in that state. The cross section of the first pipe material 31 is a rectangle that is constant in the longitudinal direction and has four sides a, b, c, and d, and a groove-shaped bead 31a is formed in one side a. Furthermore, the cross section of the second pipe material 32 is a trapezoid that is constant in the longitudinal direction and has an upper base a, a lower base b, a leg c, and a leg d, and a groove-shaped bead 32a is formed in the leg c, which is perpendicular to the upper base a and the lower base b.

The front side frame 11 includes a front-side first horizontal portion 11a disposed substantially horizontally, a rear-side second horizontal portion 11b disposed substantially horizontally, and an inclined portion 11c sandwiched by the first and second horizontal portions 11a and 11b. The inclined portion 11c bends downwardly and inwardly in the vehicle width direction from the rear end of the first horizontal portion 11a and is connected to the front end of the second horizontal portion 11b.

Figure 4:
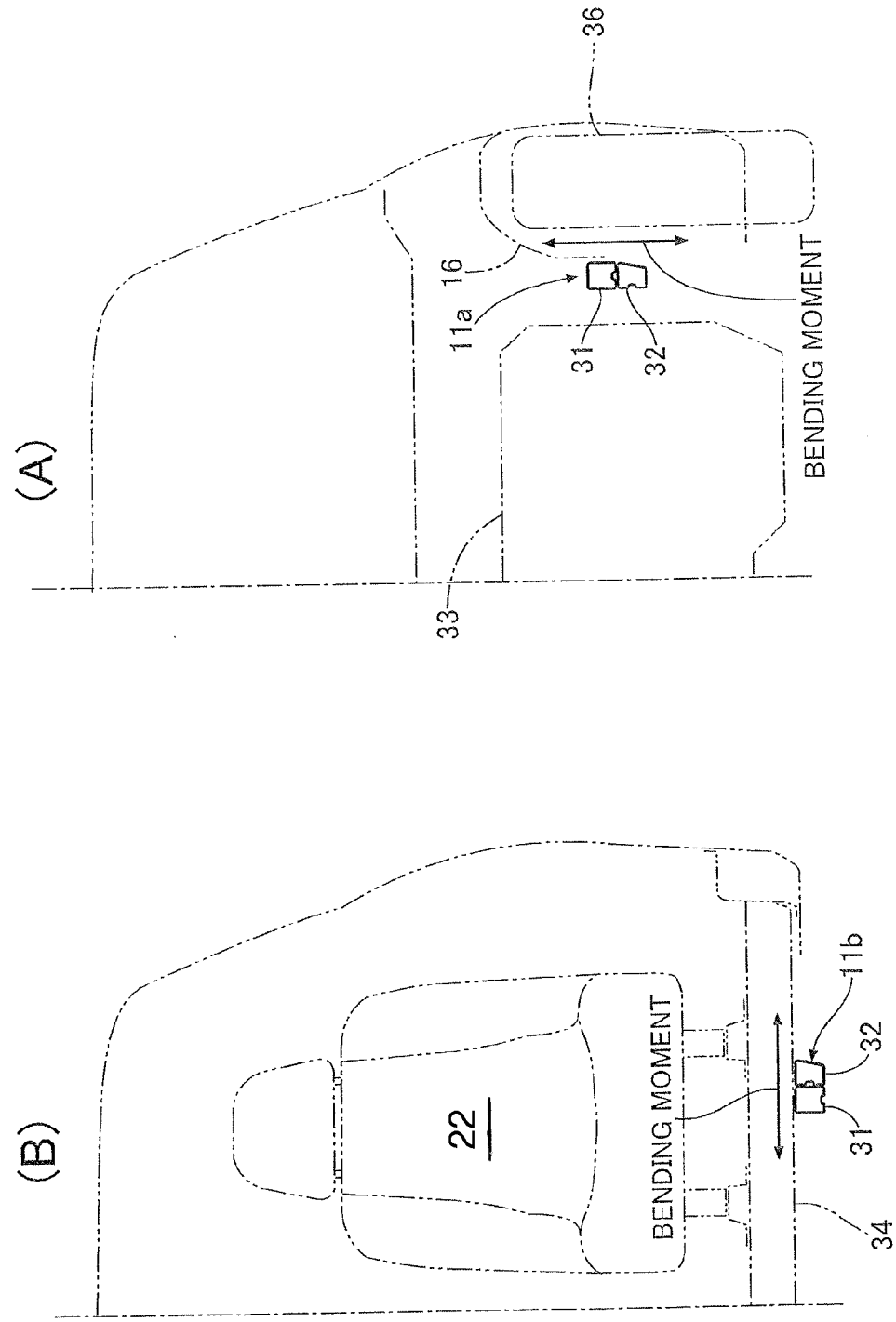
FIG. 4 is a sectional view along line 4(A)-4(A) and line 4(B)-4(B) in FIG. 1. (first embodiment)

As shown in FIG. 3 (A) and FIG. 4 (A), in the first horizontal portion 11a of the front side frame 11, the first and second pipe materials 31, 32 are arranged in a first, substantially vertically stacked direction relative to one another. In this configuration, the lower base b of the second pipe material 32 is disposed so as to be the uppermost part of the second pipe material 32, the downwardly disposed side a of the first pipe material 31 is superimposed thereon, and they are joined integrally by MIG welds w1. Therefore, the bead 31a of the first pipe material 31 opens downwardly and is blocked by the lower base b of the second pipe material 32, and the bead 32a of the second pipe material 32 opens inwardly in the vehicle width direction.

As shown in FIG. 3 (D) and FIG. 4 (B), in the second horizontal portion 11b of the front side frame 11, the positional relationship between the first pipe material 31 and the second pipe material 32 is changed; the first pipe material 31, is positioned inwardly in the vehicle width direction of the second pipe material 32 for the second horizontal portion 11b, and they are joined integrally by MIG welds w2. In other words, in the second horizontal portion 11b, the first and second pipe materials 31, 32 are arranged in a second, substantially horizontal side-by-side direction relative to one another. Therefore, the bead 32a of the second pipe material 32 opens inwardly in the vehicle width direction and is blocked by the side d of the first pipe material 31, and the bead 31a of the first pipe material 31 opens downwardly.

As shown in FIG. 3 (B) and FIG. 3 (C), in the inclined portion 11c sandwiched by the first horizontal portion 11a and the second horizontal portion 11b, the first pipe material 31 moves from above the second pipe material 32 inwardly in the vehicle width direction. In this arrangement, the first pipe material 31 and the second pipe material 32 first move relative to each other in the left-and-right direction without being twisted and then move relative to each other in the vertical direction to thus change their positional relationship. In the inclined portion 11c, the first pipe material 31 and the second pipe material 32 are not welded, and the welds w1 of the first horizontal portion 11a and the welds w2 of the second horizontal portion 11b are therefore not continuous.

As shown in FIG. 4 (A), the first horizontal portion 11a, which is disposed in a narrow section sandwiched by a tire 36 and the power plant 33 in the interior of an engine compartment, has a vertically long cross-sectional shape in which the first pipe material 31 and the second pipe material 32 are superimposed in the vertical direction, and the layout thereof is easy. In particular, the trapezoidal cross-sectional shape of the second pipe material 32 is effective in avoiding interference with the tire 36. The first horizontal portion 11a protrudes toward the front of the chassis in a cantilevered manner, and since the power plant 33, which has a large weight, is supported thereon, a large bending moment in the vertical direction acts thereon, and the bending moment in the vertical direction can be supported effectively by the vertically long cross-sectional shape.

As shown in FIG. 4 (B), since in the second horizontal portion 11b disposed along a lower face of a floor panel 34 of a passenger compartment [below a passenger seat 22], the first pipe material 31 and the second pipe material 32 are superimposed in the left-and-right direction so as to have a horizontally long cross-sectional shape, it is easy to ensure a minimum ground clearance for the chassis. Furthermore, when the vehicle is turning, a load in the vehicle width direction is inputted into the second horizontal portion 11b from front and rear suspension devices and a large bending moment in the left-and-right direction therefore acts thereon, but it is possible to support effectively the bending moment in the left-and-right direction by means of the horizontally long cross-sectional shape.

Moreover, in the first horizontal portion 11a shown in FIG. 3 (A), since the side a of the first pipe material 31 and the lower base b of the second pipe material 32 are joined, when a bending moment acts on the front side frame 11, the side a and the lower base b are inhibited from deforming so as to protrude outward. Furthermore, in the second horizontal portion 11b shown in FIG. 3 (D), since the side d of the first pipe material 31 and the leg c of the second pipe material 32 are joined, when a bending moment acts on the front side frame 11, the side d and the leg c are inhibited from deforming so as to protrude outward. In this way, due to the first and second pipe materials 31 and 32 being joined, the bending stiffness of the front side frame 11 is enhanced.

As described above, since the front side frame 11 is formed by combining the first pipe material 31 and the second pipe material 32, and the positional relationship between the first pipe material 31 and the second pipe material 32 is made different for each section of the front side frame 11, it is possible to change the cross-sectional shape and bending stiffness among sections of the front side frame 11 while employing a pipe material having a constant cross section, and it is possible to provide the front side frame 11 having light weight and high stiffness at low cost.

A chassis frame that has been assembled is immersed in an electrodeposition coating liquid to thus carry out electrodeposition coating; there is a possibility that it will become difficult to subject a space S1 between the bead 31a of the first pipe material 31 and the lower base b of the second pipe material 32 shown in FIG. 3 (A) or a space S2 between the bead 32a of the second pipe material 32 and the side d of the first pipe material 31 shown in FIG. 3 (D) to coating with the electrodeposition coating liquid. However, in accordance with the present embodiment, since the bead 31a of the first pipe material 31 opens at the cross section position of the inclined portion 11c shown in FIG. 3 (B), the electrodeposition coating liquid can be reliably made to flow into the space S1 via the opening. Similarly, since the bead 32a of the second pipe material 32 opens at the cross section position of the inclined portion 11c shown in FIG. 3 (C), the electrodeposition coating liquid can be reliably made to flow into the space S2 via the opening.

Second Embodiment

Figure 5:
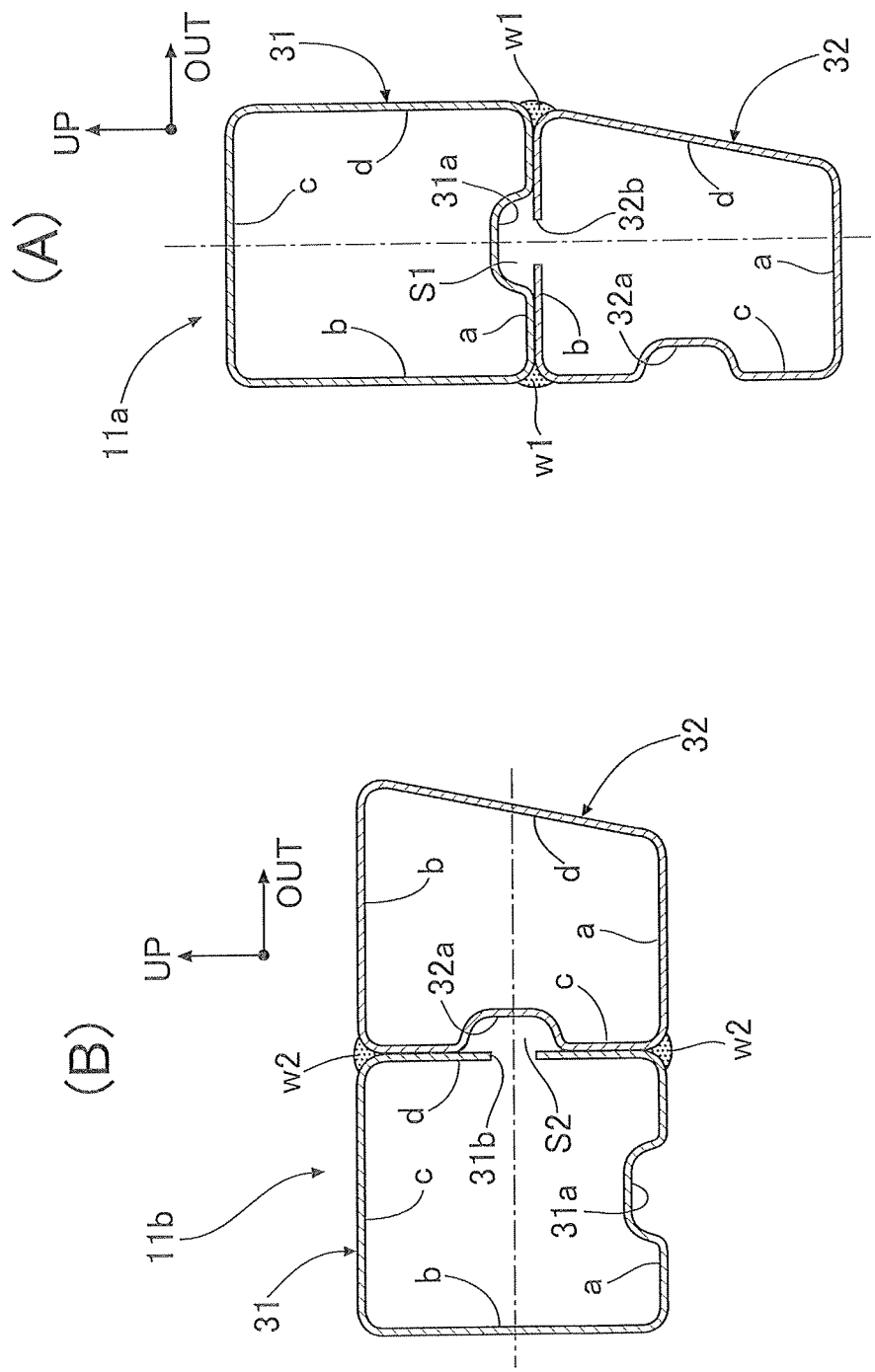
FIG. 5 is a view corresponding to FIG. 3 (A) and FIG. 3 (D). (second embodiment)

A second embodiment of the present invention is now explained by reference to FIG. 5.

The second embodiment is for carrying out coating with an electrodeposition coating liquid more reliably. As shown in FIG. 5 (A), an opening 32b is formed in a lower base b of a second pipe material 32 facing a space S1 defined within a bead 31a of a first pipe material 31, and an electrodeposition coating liquid can thus be made to flow into the space S1 from the interior of the second pipe material 32 more reliably. Similarly, as shown in FIG. 5 (B), an opening 31b is formed in a side d of the first pipe material 31 facing a space S2 defined within a bead 32a of the second pipe material 32, and an electrodeposition coating liquid can thus be made to flow into the space S2 from the interior of the first pipe material 31 more reliably.

Third Embodiment

A third embodiment of the present invention is now explained by reference to FIG. 6.

Figure 6:
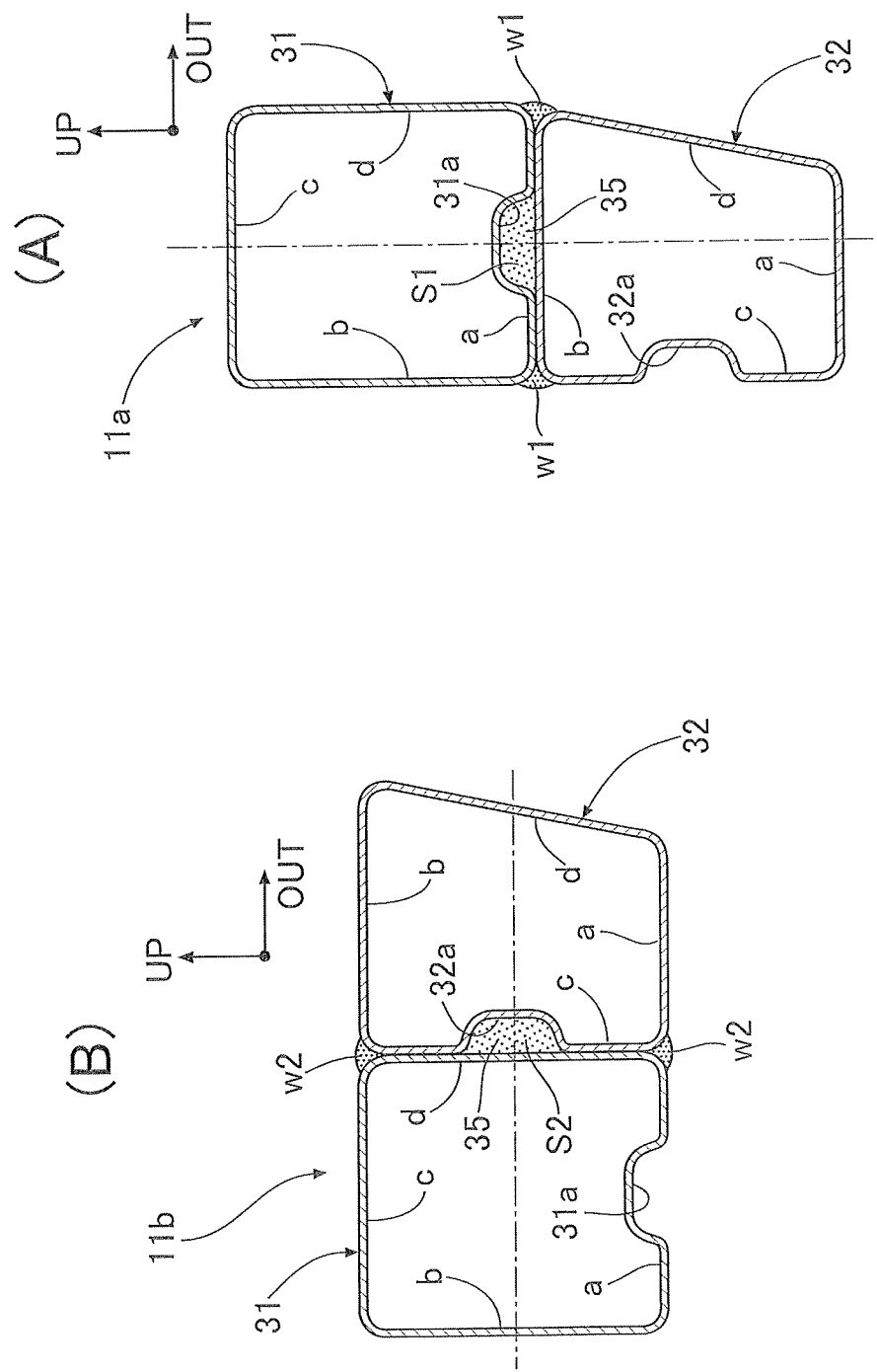
FIG. 6 is a view corresponding to FIG. 3 (A) and FIG. 3 (D). (third embodiment)

The third embodiment is for enhancing the rustproofing properties of a front side frame 11 and is one as shown in FIG. 6 (A) and FIG. 6 (B) in which a wax-like rustproofing agent 35 is poured into a space S1 defined within a bead 31a of a first pipe material 31 and a space S2 defined within a bead 32a of a second pipe material 32. Pouring of the rustproofing agent 35 may be carried out via an opening of the bead 31a at the front end of a first horizontal portion 11a, an opening of the bead 32a at the rear end of a second horizontal portion 11b, or openings (see FIG. 3 (B) and FIG. 3 (C)) of the beads 31a and 32a in an inclined portion 11c.

Furthermore, as shown in FIG. 6 (A), when the first pipe material 31 and the second pipe material 32 are superimposed in the vertical direction, forming the bead 31a in a side a, which is a lower face of the first pipe material 31 on the upper side, makes it difficult for water to build up within the bead 31a, thus enabling the rustproofing properties of the front side frame 11 to be enhanced. In this arrangement, if the bead 32a were formed in a lower base b, which is an upper face of the second pipe material 32 on the lower side, the bead 32a would become groove-shaped and water could easily build up, and the rustproofing properties would be degraded.

When an automobile is involved in a frontal collision and a rearward collision load is inputted into the front end of the front side frames 11 and 11, if the front side frames 11 and 11 can be bent at a desired position, it becomes possible to minimize deformation of a passenger compartment, thus enhancing collision safety. In order to do so, it is desirable to provide a partially strong or weak portion by means of a hardening treatment, an annealing treatment, etc., thus making the front side frame 11 bend in a desired direction.

Fourth Embodiment

Figure 7:
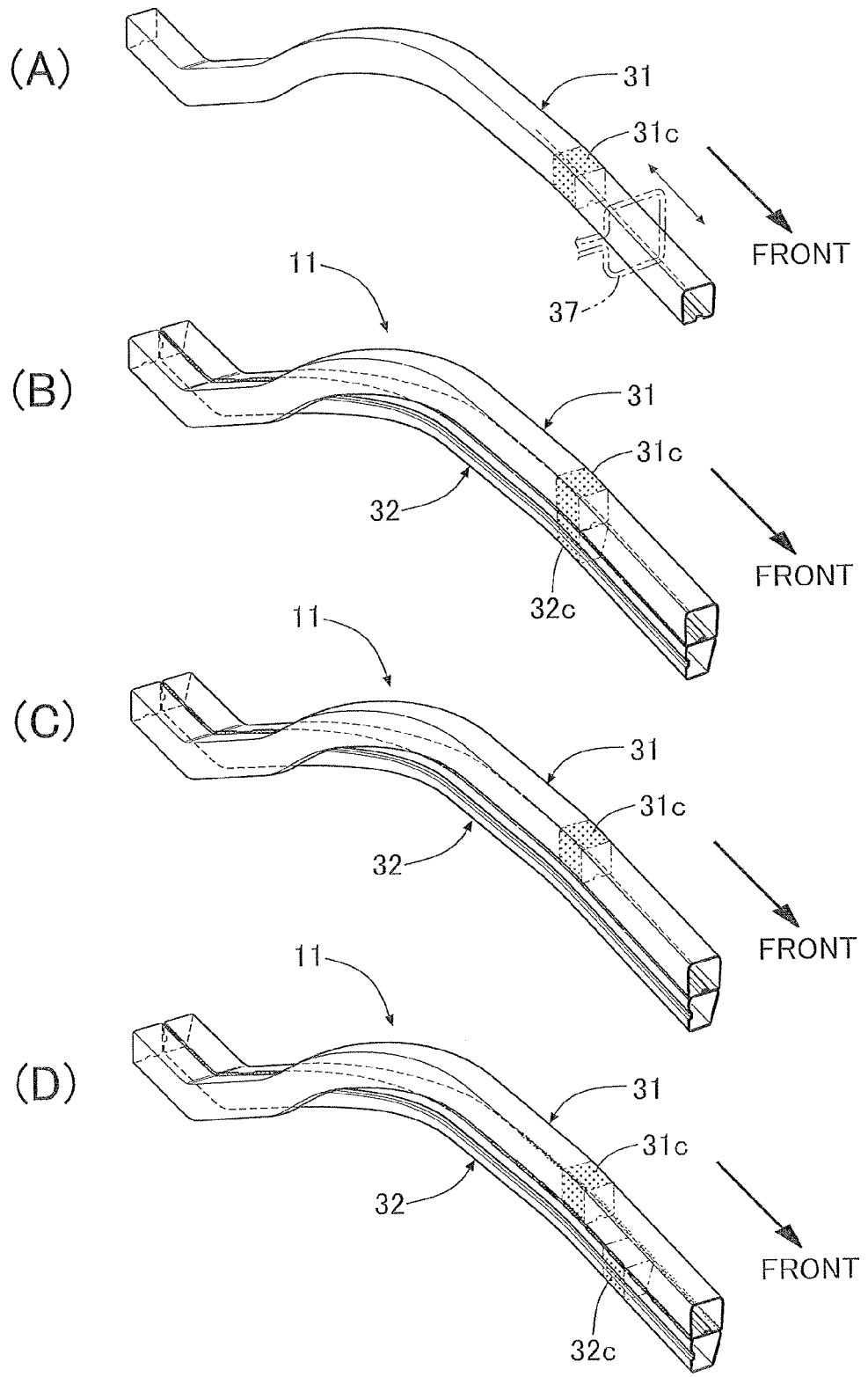
FIG. 7 is a diagram for explaining a weak portion of a front side frame. (fourth embodiment)

FIG. 7 shows a fourth embodiment of the present invention; FIG. 7 (A) shows a method for forming a weak portion 31c by for example subjecting part of a first pipe material 31 to an annealing treatment. By heating part of the first pipe material 31, which has been subjected to bending of a straight tube into a predetermined shape by means of hot bending at the same time as a hardening treatment, by means of a high frequency heating coil 37 fitted around the outer periphery thereof, and gradually cooling it, the part undergoes an annealing treatment to thus form a weak portion 31c.

In FIG. 7 (B), since the position of the weak portion 31c of the first pipe material 31 and the position of a weak portion 32c of a second pipe material 32 coincide with each other in the longitudinal direction of a front side frame 11, the front side frame 11 can be bent at the positions of the weak portions 31c and 32c when an automobile is involved in a frontal collision.

In FIG. 7 (C), the weak portion 31c is formed in only one of the first pipe material 31 and the second pipe material 32, for example, the first pipe material 31 on the upper side, and the front side frame 11 can be bent upwardly at the position of the weak portion 31c when an automobile is involved in a frontal collision. On the other hand, in this arrangement, if the weak portion 32c were formed only in the second pipe material 32 on the lower side, the front side frame 11 could be bent downwardly at the position of the weak portion 32c when an automobile is involved in a frontal collision.

In FIG. 7 (D), the positions of the weak portions 31c and 32c of the first pipe material 31 and the second pipe material 32 are staggered in the longitudinal direction of the front side frame 11, and by so doing it becomes possible to more finely control a bending mode of the front side frame 11 when an automobile is involved in a frontal collision.

Fifth Embodiment

A fifth embodiment of the present invention is now explained by reference to FIG. 8.

In the fourth embodiment, the bending mode of the front side frame 11 is controlled by the weak portions 31c and 32c, but in the fifth embodiment the bending mode of a front side frame 11 is controlled by welds w1 and w2 of first and second pipe materials 31 and 32.

Figure 8:
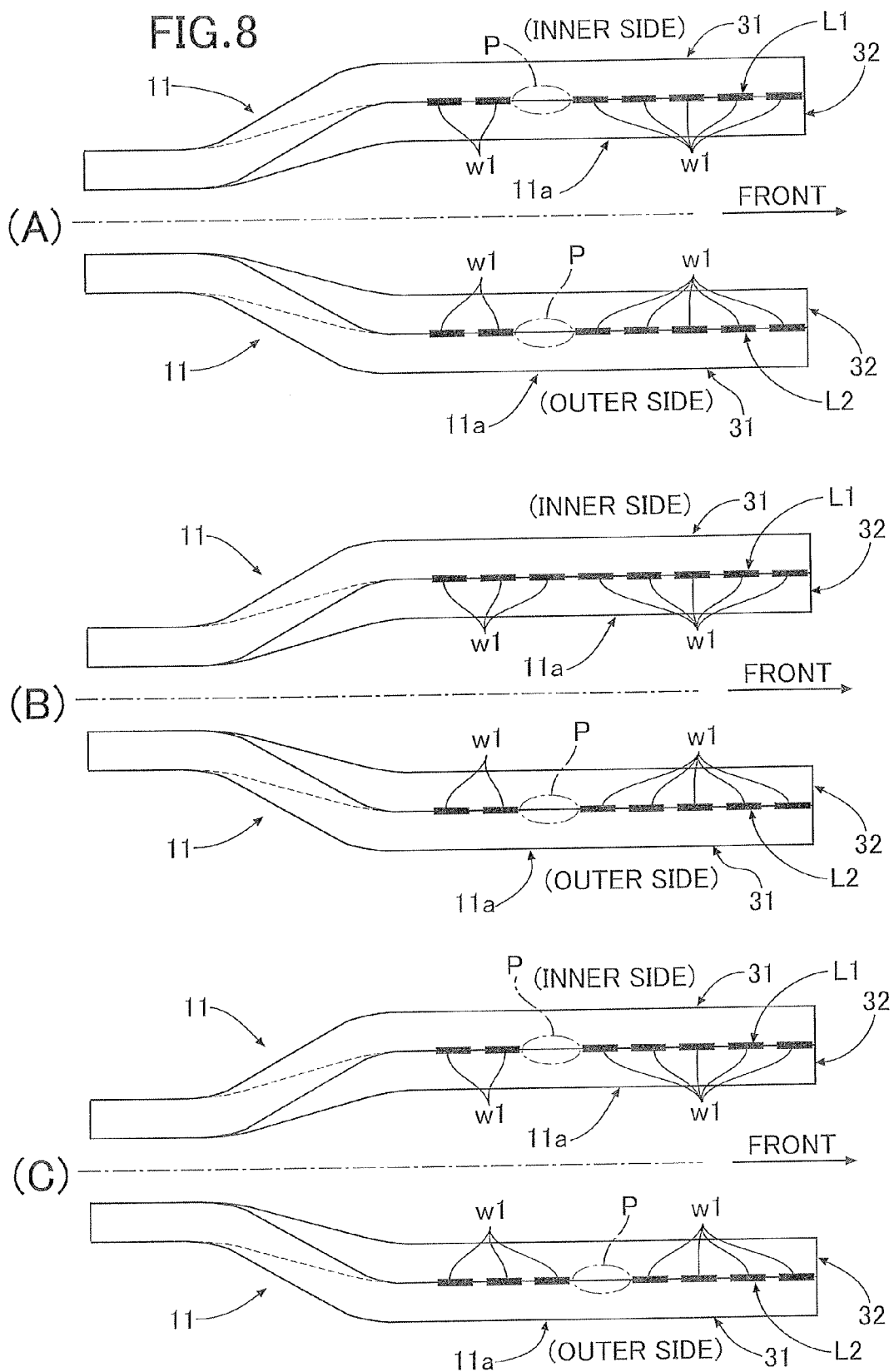
FIG. 8 is a diagram for explaining a weld line of a front side frame. (fifth embodiment)

FIG. 8 shows the arrangement of a first weld line L1 on the inner side in the vehicle width direction of the front side frame 11 and a second weld line L2 on the outer side in the vehicle width direction thereof. In a first horizontal portion 11a of the front side frame 11, the first pipe material 31 and the second pipe material 32 are welded intermittently (perforated manner) along the first and second weld lines L1 and L2 on the inner side and the outer side in the vehicle width direction. The bold line shows a welded portion, and a portion where the bold line is discontinued shows a non-welded portion. The length of a non-welded portion is defined as the weld pitch; varying the weld pitch so as to change the bending stiffness of the front side frame 11 enables the bending mode to be controlled. Specifically, the larger the weld pitch, which is the length of a non-welded portion, the lower the strength of the portion and the weaker it is with respect to bending load.

In FIG. 8 (A), large pitch parts P and P having a large weld pitch are formed at one position of each of the first weld line L1 and the second weld line L2, and these two large pitch parts P and P are aligned at the same positions in the longitudinal direction of the front side frame 11. Therefore, in accordance with this embodiment, when a vehicle is involved in a frontal collision the front side frame 11 can be bent at the positions of the two large pitch parts P and P.

In FIG. 8 (B), the weld pitch of the first weld line L1 is constant, but a large pitch part P having a large weld pitch is formed at one position of the second weld line L2. Therefore, in accordance with this embodiment, when a vehicle is involved in a frontal collision the front side frame 11 can be bent outwardly in the vehicle width direction at the position of the large pitch part P.

In FIG. 8 (C), large pitch parts P and P having a large weld pitch are formed at one position of each of the first weld line L1 and the second weld line L2, but the positions of the two large pitch parts P and P are staggered in the longitudinal direction of the front side frame 11, and by so doing the bending mode of the front side frame 11 when an automobile is involved in a frontal collision can be controlled yet more finely.

The weld lines L1 and L2 of the first horizontal portion 11a of the front side frame 11 are explained above, but the same applies to a weld line of a second horizontal portion 11b of the front side frame 11.

Sixth Embodiment

A sixth embodiment of the present invention is explained below by reference to FIG. 9 to FIG. 14.

Figure 9:
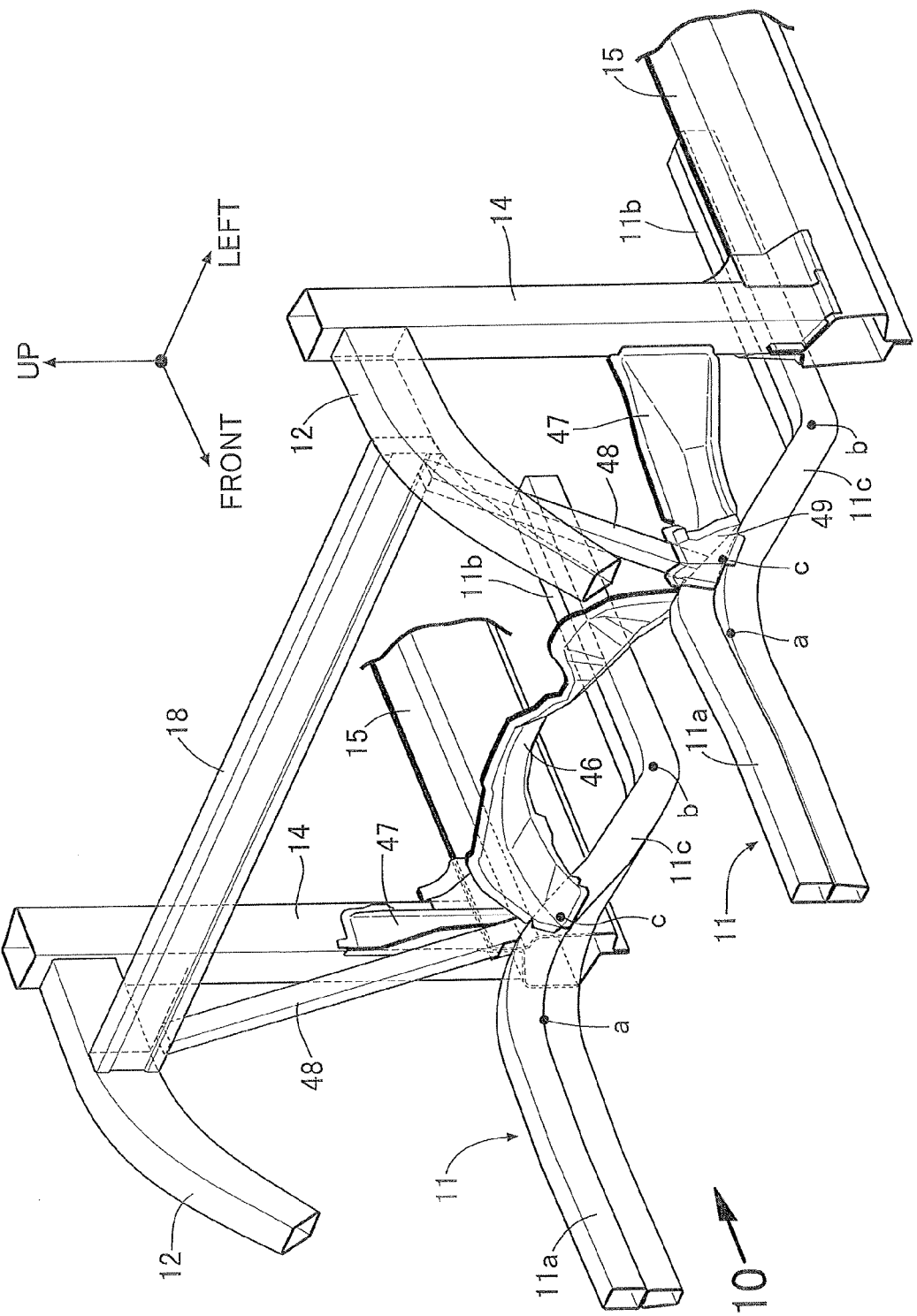
FIG. 9 is a perspective view showing a frame structure of a front part of an automobile chassis. (sixth embodiment)
Figure 10:
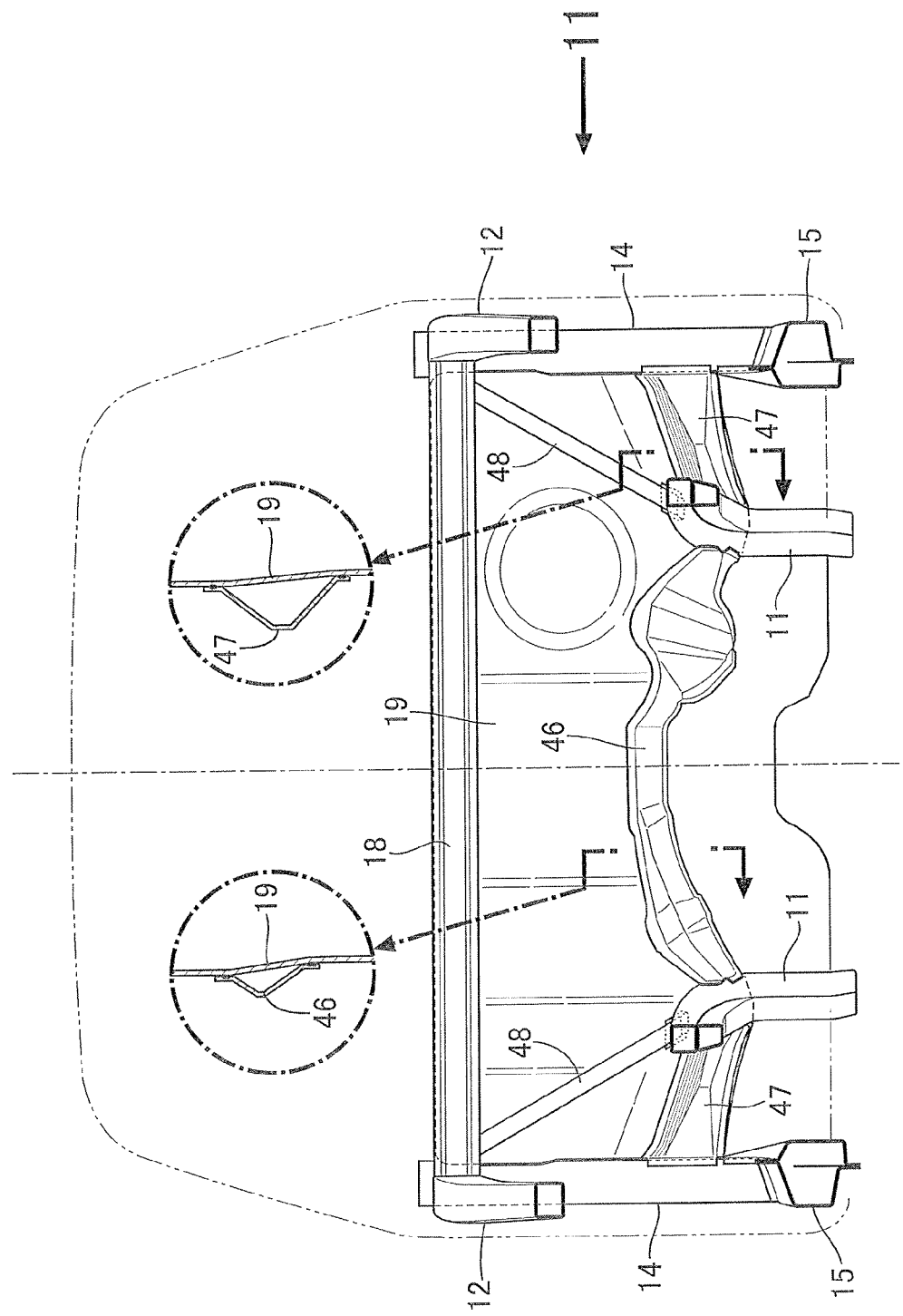
FIG. 10 is a view in the direction of arrow 10 in FIG. 9. (sixth embodiment)
Figure 11:
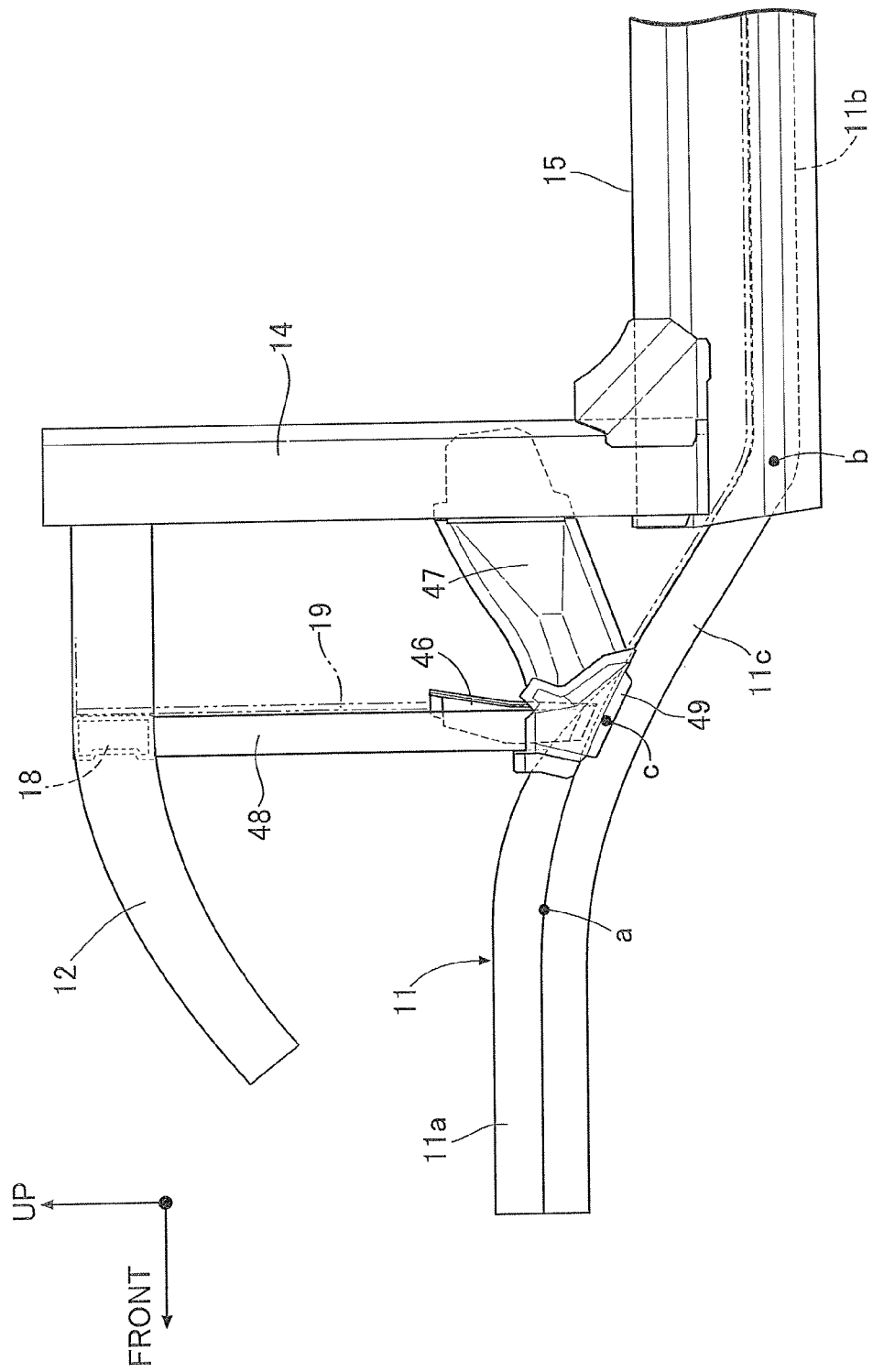
FIG. 11 is a view in the direction of arrow 11 in FIG. 10. (sixth embodiment)

As shown in FIG. 9 to FIG. 11, a pair of left and right front side frames 11 and 11 disposed in the fore-and-aft direction in a front part of an automobile chassis include first horizontal portions 11a and 11a that extend substantially horizontally in the interior of an engine compartment, inclined portions 11c and 11c that extend from the rear ends of the first horizontal portions 11a and 11a while being inclined downwardly and inwardly in the vehicle width direction, and second horizontal portions 11b and 11b that extend from the rear ends of the inclined portions 11c and 11c substantially horizontally along the underneath of a passenger compartment. Front-side bent parts a and a bending so as to protrude upwardly are formed at the interface between the first horizontal portions 11a and 11a and the inclined portions 11c and 11c, and rear-side bent parts b and b bending so as to protrude downwardly are formed at the interface between the inclined portions 11c and 11c and the second horizontal portions 11b and 11b. The front side frames 11 and 11 are formed from a pipe material having a closed cross-section; the cross-sectional shape thereof is a vertically long rectangle in the first horizontal portions 11a and 11a, is a horizontally long rectangle in the second horizontal portions 11b and 11b, and is twisted through 90° from the vertically long state to the horizontally long state in the inclined portions 11c and 11c.

A pair of left and right side sills 15 and 15 are disposed in the fore-and-aft direction on the outer side in the vehicle width direction of the second horizontal portions 11b and 11b of the front side frames 11 and 11, and lower ends of front pillar lowers 14 and 14 extending in the vertical direction are connected to the front ends of the side sills 15 and 15. Rear ends of a pair of left and right wheel house upper members 12 and 12 extending so as to be inclined downwardly to the front are connected to the upper ends of the front pillar lowers 14 and 14, and the pair of left and right wheel house upper members 12 and 12 or the left and right front pillar lowers 14 and 14 are linked via a dashboard upper cross member 18 extending in the vehicle width direction.

Inner faces in the vehicle width direction of positions (linking parts c and c) slightly to the rear of the front-side bent parts a and a in the inclined portions 11c and 11c of the pair of left and right front side frames 11 and 11 are linked via a first linking member 46 extending in the vehicle width direction. The first linking member 46 is a member that is flange-welded to a front face of a dashboard lower 19 to form a closed cross-section (see FIG. 10), its central part curving slightly so as to protrude upwardly when viewed from the front, and its central part curving slightly so as to protrude rearwardly when viewed from above.

Outer faces in the vehicle width direction of the linking parts c and c of the front side frames 11 and 11 and inner faces in the vehicle width direction of the front pillar lowers 14 and 14 are liked via a pair of left and right second linking members 47 and 47. Each of the second linking members 47 is a member that is flange-welded to the front face of the dashboard lower 19 to form a closed cross-section (see FIG. 10), is disposed so that its rear end side is inclined outwardly in the vehicle width direction when viewed from above, and is disposed on substantially the same horizontal line as the first linking member 46 when viewed from the front.

Upper faces of the linking parts c and c of the front side frames 11 and 11 and lower faces of opposite end parts in the vehicle width direction of the dashboard upper cross member 18 are linked via a pair of left and right third linking members 48 and 48. Each third linking member 48 is a pipe material having a square cross section, is disposed so that the upper end side is inclined outwardly in the vehicle width direction when viewed from the front, and is disposed on a vertical line when viewed from the side.

The front end of the second linking member 47 and the lower end of the third linking member 48 are connected to the linking part c of the front side frame 11 via a joining member 49 formed from a sheet metal pressed material. That is, the joining member 49 integrally links the outer face in the vehicle width direction of the front side frame 11, the front-side sheet metal pressed material of the second linking member 47, and the front face and the outer face in the vehicle width direction of the third linking member 48. The joining member 49 is weak against the input of a collision load compared with the front side frames 11 and 11, the second linking members 47 and 47, and the third linking members 48 and 48.

Figure 12:
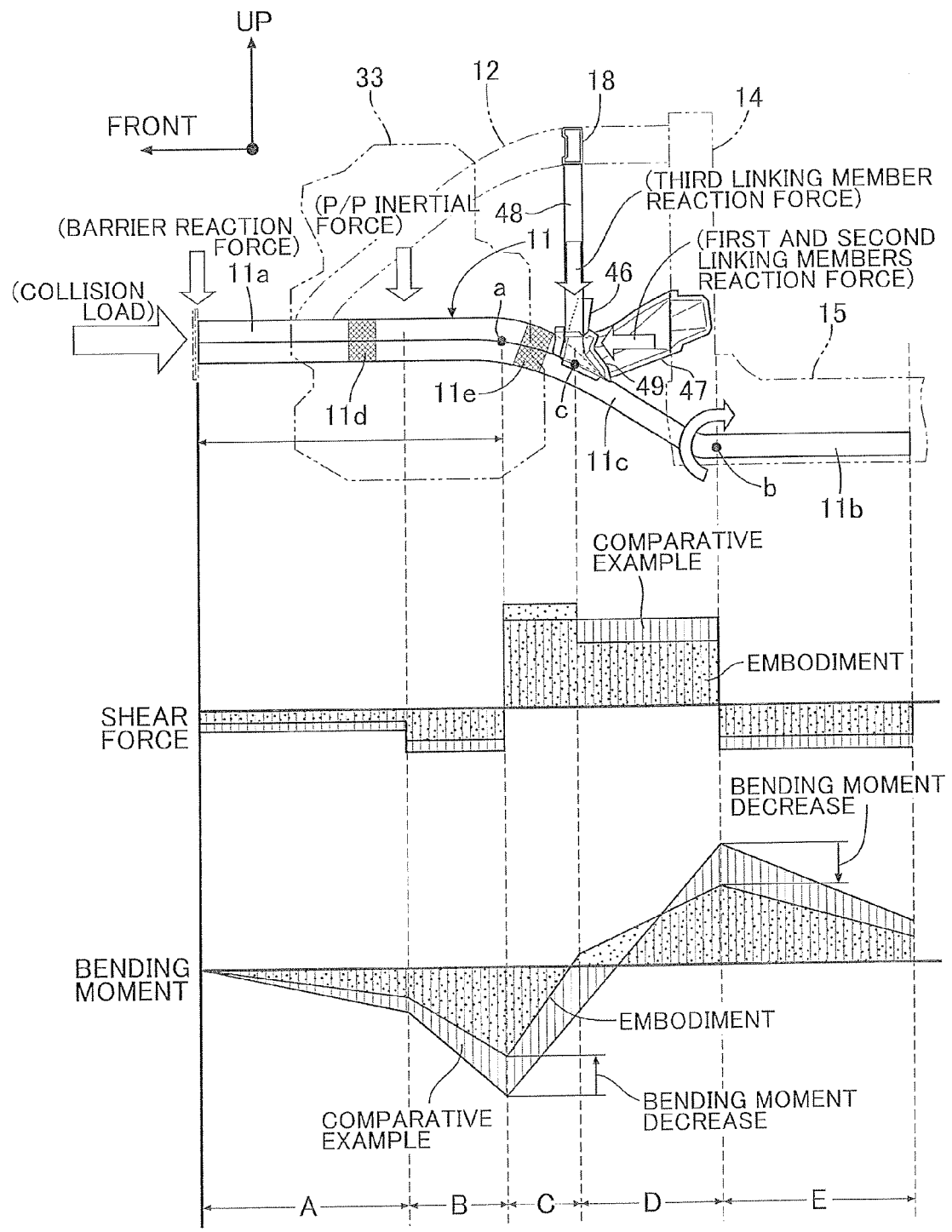
FIG. 12 is a diagram for explaining a shear force and a bending moment applied to a front side frame. (sixth embodiment)

As shown in FIG. 12, a power plant 33 integrally including an engine and a transmission is supported between the first horizontal portions 11a and 11a of the pair of left and right front side frames 11 and 11. Front-side weak portions 11d and 11d are formed on the first horizontal portions 11a and 11a slightly toward the front of the part for supporting the power plant 33, and rear-side weak portions 11e and 11e are formed between the front-side bent parts a and a and the linking parts c and c.

The front-side weak portion 11d and the rear-side weak portion 11e are portions that are formed by subjecting part of the front side frame 11, that has been subjected to a hardening treatment, to an annealing treatment so as to locally have a lower strength than the other parts of the front side frame 11. The front-side weak portion 11d and the rear-side weak portion 11e may be formed by forming a cutout, an opening, a bent bead, etc. in part of the front side frame 11 instead of the annealing treatment. Furthermore, instead of carrying out a thermal treatment such as a hardening treatment or an annealing treatment, a difference in strength may be imparted by joining a reinforcing component to sections other than the front-side weak portion 11d and the rear-side weak portion 11e.

The operation of the embodiment of the present invention having the above-mentioned arrangement is now explained.

FIG. 12 shows the distribution of shear force and bending moment acting on five regions A to E defined from the front to the rear along the fore-and-aft direction of the front side frames 11 and 11. Region A is a region from the front ends of the front side frames 11 and 11 to the part for supporting the power plant 33, region B is a region from the part for supporting the power plant 33 to the front-side bent part a, region C is a region from the front-side bent part a to the linking part c, region D is a region from the linking part c to the rear-side bent part b, and region E is a region from the rear-side bent part b to the rear end of the front side frames 11 and 11. Furthermore, dark-colored sections for the shear force and the bending moment correspond to the embodiment, and pale-colored sections correspond to a Comparative Example, that is, one in which the first to third linking members 46, 47, 47, 48, and 48 are eliminated from the embodiment. The shear force and the bending moment are defined to be positive on the upper side of the abscissa and negative on the lower side of the abscissa.

When an automobile is involved in a frontal collision with an obstacle and a rearward collision load is inputted into the front ends of the front side frames 11 and 11, the front ends of the front side frames 11 and 11, which are inclined downwardly in the inclined portions 11c and 11c, attempt to bend upwardly with the rear-side bent part b as a center, they receive a downward reaction force (barrier reaction force) from the obstacle and, furthermore, a downward inertial force due to the weight of the power plant 33 acts on the support part for the power plant 33. Therefore, a negative shear force due to the barrier reaction force acts on region A, and a larger negative shear force due to the barrier reaction force and the inertial force of the power plant 33 acts on region B. Since region C and region D correspond to the inclined portions 11c and 11c of the front side frames 11 and 11, a positive shear force is generated by the collision load, and since the positive shear force is larger than the negative shear force in region B, as a result a positive shear force acts on region C and region D. Since in region E a positive shear force due to the collision load disappears, the same negative shear force as that in region B acts thereon. Therefore, a bending moment calculated from the shear force has a negative peak in the front-side bent part a and a positive peak in the rear-side bent part b.

On the other hand, in the embodiment, which includes the first to third linking members 46, 47, 47, 48, and 48, since the first linking member 46, the second linking members 47 and 47, and the third linking members 48 and 48 are connected to the linking part c of the inclined portions 11c and 11c of the front side frames 11 and 11, which is inclined downwardly to the rear, a forward reaction force acts on the linking part c from the first and second linking members 46, 47, and 47, and a downward reaction force acts on the linking part c from the third linking members 48 and 48. The inertial force of the power plant 33 and the barrier reaction force are counterbalanced by the forward reaction force and the downward reaction force, and the negative shear force in region A and region B therefore decreases. In region C, the shear force increases locally, but in region D the shear force decreases due to the forward and downward reaction forces from the first to third linking members 46, 47, 47, 48, and 48, and in region E the negative shear force decreases as in region B. As a result, the peaks, in the front-side bent part a and the rear-side bent part b, of the bending moment calculated from the shear force also decrease.

In this way, the bending moment acting on the front side frames 11 and 11 can be reduced by the first to third linking members 46, 47, 47, 48, and 48, and it is therefore possible to reduce the width of the front side frames 11 and 11, thus lightening the weight of the chassis. Furthermore, the bending moment acting on the front side frames 11 and 11 can be reduced by eliminating the third linking members 48 and 48 and providing only the first linking member 46 and the second linking members 47 and 47, but since the effect in reducing the bending moment by means of a downward reaction force generated by the third linking members 48 and 48 is large, a weight that exceeds the weight of the third linking members 48 and 48 can be cut from the front side frames 11 and 11, thus reducing the overall weight of the chassis.

Furthermore, since the bending moment acting on the first linking member 46 and the second linking members 47 and 47 can be reduced by means of a downward reaction force generated by the third linking members 48 and 48, the first to third linking members 46, 47, 47, 48, and 48 can transmit the load with as much axial force as possible, and it becomes possible to minimize any increase in weight by lightening the weight of the first to third linking members 46, 47, 47, 48, and 48.

Moreover, since, when viewed from the front, the first linking member 46 extends from the linking part c inwardly in the vehicle width direction and the second linking members 47 and 47 and the third linking members 48 and 48 extend from the linking part c outwardly in the vehicle width direction, when a collision load is inputted it is possible to support the front side frames 11 and 11 from the inner side and the outer side in the vehicle width direction, thus preventing them from bending in the vehicle width direction via a part to the rear of the linking part c.

As shown in FIG. 13 (A), when a collision load due to a frontal collision is inputted into the front side frames 11 and 11, if the collision load is transmitted directly to the second linking members 47 and 47 and the third linking members 48 and 48, the second linking members 47 and 47 and the third linking members 48 and 48 are deformed and a desired reaction force cannot be generated, but since the second linking members 47 and 47 and the third linking members 48 and 48 are connected to the front side frames 11 and 11 via the joining members 49 and 49, which are weak, the joining members 49 and 49 crumple, thus preventing effectively the second linking members 47 and 47 and the third linking members 48 and 48 from being deformed.

Furthermore, as shown in FIG. 13 (B), due to a frontal collision the front-side weak portions 11d and 11d and the rear weak portions 11e and 11e of the front side frames 11 and 11 bend so as to absorb an impact, and in this process the weak joining members 49 and 49 crumple, thus maintaining the angle between the first linking member 46 and the second linking members 47 and 47 in the state they were in prior to the collision and thereby avoiding any increase in the bending moment caused by a change in the angle.

Figure 14:
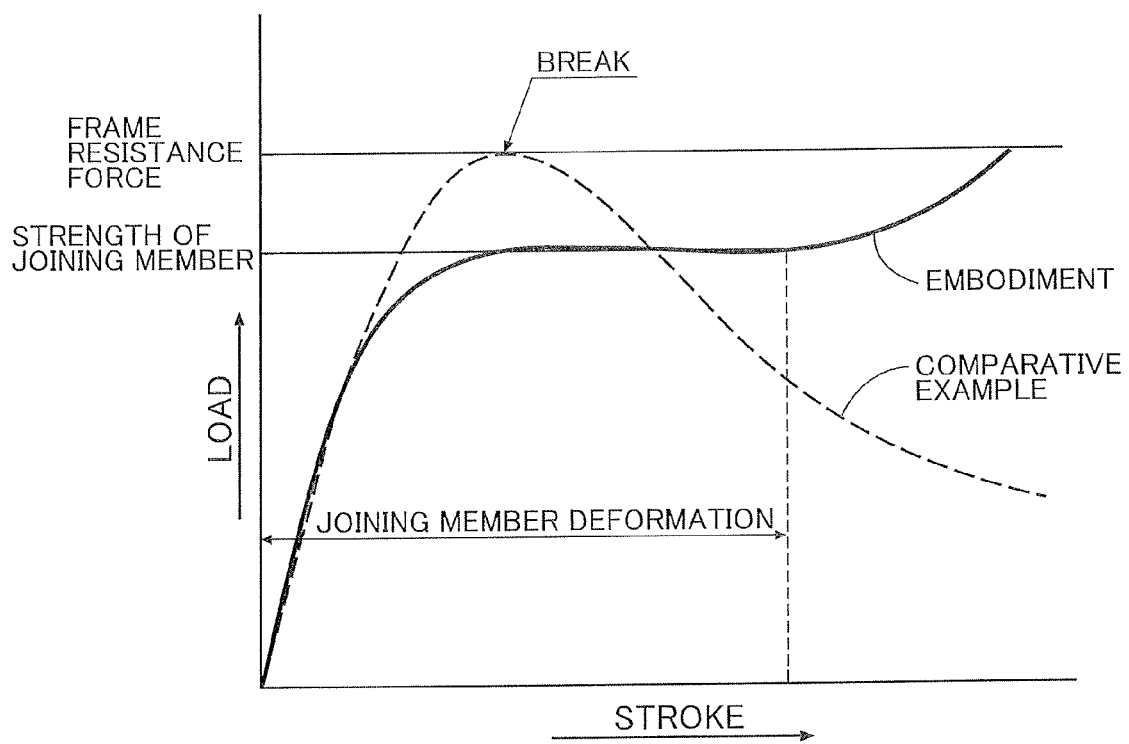
FIG. 14 is a diagram for explaining the effect of a joining member. (sixth embodiment)

If the second linking members 47 and 47 and the third linking members 48 and 48 were connected directly to the front side frames 11 and 11 without the joining members 49 and 49, as shown by the broken line in FIG. 14 the second linking members 47 and 47 and the third linking members 48 and 48 would break in the vicinity of the linking part c and could not transmit a sufficient load, and the bending moment applied to the front side frames 11 and 11 would increase. On the other hand, in the present embodiment, as shown by the solid line in FIG. 14 the joining members 49 and 49 crumple and the second linking members 47 and 47 and the third linking members 48 and 48 do not bend in the vicinity of the linking part c and can transmit a sufficient load, thereby reducing the bending moment applied to the front side frames 11 and 11.

Seventh Embodiment

Figure 15:
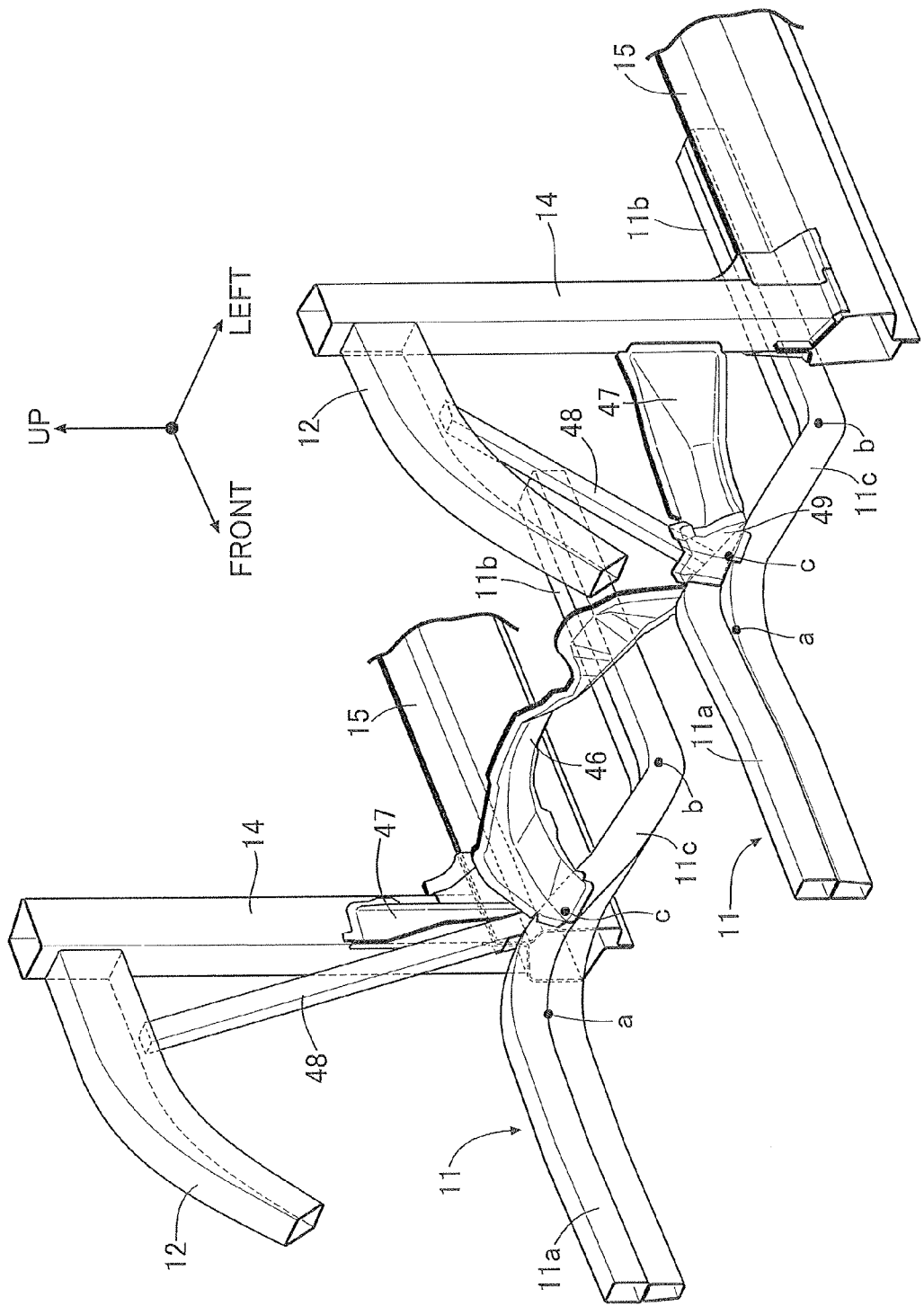
FIG. 15 is a perspective view showing a frame structure of a front part of an automobile chassis. (seventh embodiment)

A seventh embodiment of the present invention is now explained by reference to FIG. 15.

In the sixth embodiment the upper ends of the third linking members 48 and 48 are connected to opposite end parts of the dashboard upper cross member 18, but in the seventh embodiment upper ends of third linking members 48 and 48 are connected to lower faces of left and right wheel house upper members 12 and 12. In accordance with the seventh embodiment also, a desired reaction force can be generated by the third linking members 48 and 48 connected to the wheel house upper members 12 and 12, thus reducing the bending moment on front side frames 11 and 11.

Eighth Embodiment

Figure 16:
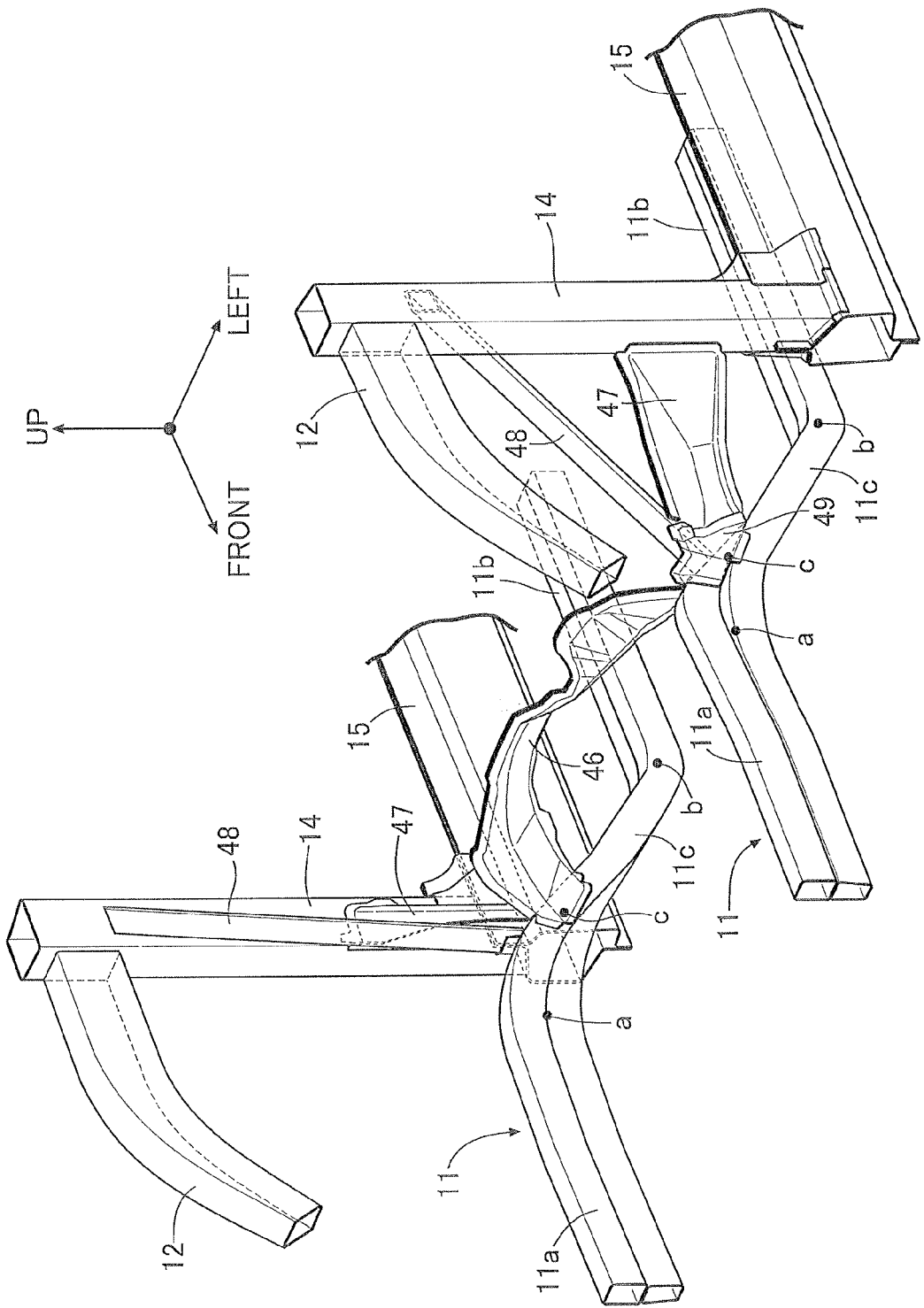
FIG. 16 is a perspective view showing a frame structure of a front part of an automobile chassis. (eighth embodiment)

An eighth embodiment of the present invention is now explained by reference to FIG. 16.

In the sixth embodiment the upper ends of the third linking members 48 and 48 are connected to opposite end parts of the dashboard upper cross member 18, and in the seventh embodiment the upper ends of the third linking members 48 and 48 are connected to the lower faces of the left and right wheel house upper members 12 and 12, but in the eighth embodiment upper ends of third linking members 48 and 48 are connected to upper parts of left and right front pillar lowers 14 and 14. In accordance with the eighth embodiment also, a desired reaction force can be generated by the third linking members 48 and 48 connected to the front pillar lowers 14 and 14, thus reducing the bending moment on front side frames 11 and 11.

Ninth Embodiment

Figure 17:
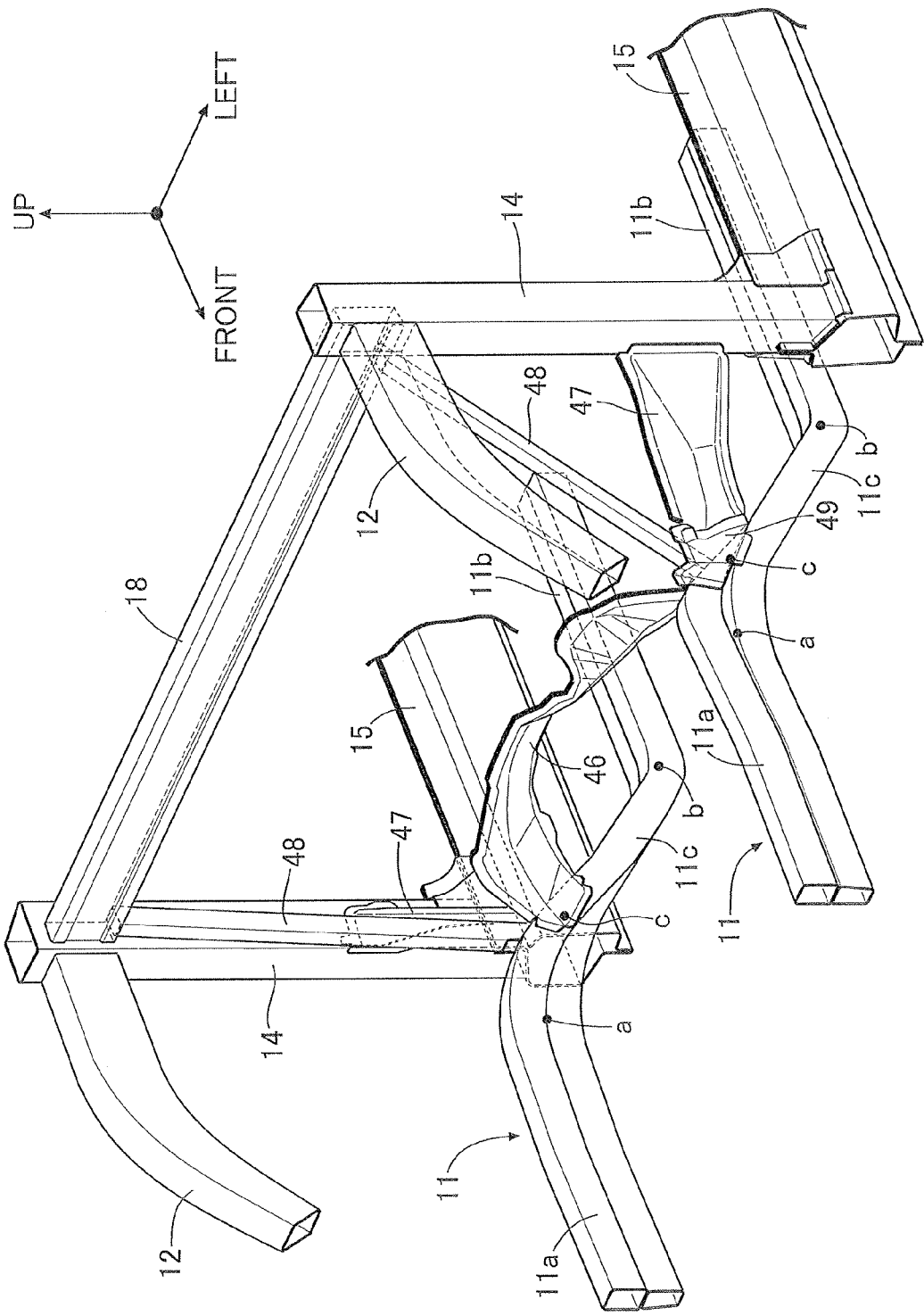
FIG. 17 is a perspective view showing a frame structure of a front part of an automobile chassis. (ninth embodiment)

A ninth embodiment of the present invention is now explained by reference to FIG. 17.

In the sixth embodiment opposite end parts in the vehicle width direction of the dashboard upper cross member 18 are connected to the left and right wheel house upper members 12 and 12, but in the ninth embodiment opposite end parts in the vehicle width direction of a dashboard upper cross member 18 are connected to upper parts of left and right front pillar lowers 14 and 14, and upper ends of third linking members 48 and 48 are connected to a lower face of the dashboard upper cross member 18. In accordance with the ninth embodiment also, a desired reaction force can be generated by the third linking members 48 and 48 connected to the dashboard upper cross member 18, thus reducing the bending moment on front side frames 11 and 11.

Embodiments of the present invention are explained above, but the present invention may be modified in a variety of ways as long as the modifications do not depart from the spirit and scope thereof.

For example, the first and second pipe materials 31 and 32 of the embodiments have a cross-sectional shape that is constant in the longitudinal direction, but they may have a cross-sectional shape that changes in the longitudinal direction as a result of hydroforming, etc.

Furthermore, the first and second pipe materials 31 and 32 of the embodiments are made of a steel material, but they may be made of aluminum or magnesium, and the cross-sectional shape thereof is not limited to a rectangle and may be another polygon.

Moreover, the front side frame 11 of the embodiments is formed from two pipe materials, but it may be formed from three or more pipe materials.

Furthermore, in the embodiments the cross-sectional shape of the front side frame 11 is changed by relative movement of the first and second pipe materials 31 and 32 in parallel, but the cross-sectional shape of the front side frame 11 may be changed by relatively rotating (twisting) the first and second pipe materials 31 and 32.

Moreover, in the embodiments the weak portions 31$c$ and 32$c$ are formed by an annealing treatment, but they may be formed by a cutout, an opening, a bent bead, etc. of the first and second pipe materials 31 and 32.

Furthermore, in the embodiments the first second pipe materials 31 and 32 are not welded in the inclined portion 11$c$, but they may be welded.

Moreover, in the embodiments the large pitch part P is formed while welding the weld lines L1 and L2 in a perforated manner, but a large pitch part P may be formed while welding weld lines L1 and L2 continuously.

Furthermore, the frame member of the present invention is not limited to the front side frame 11 of the embodiments.

Moreover, in the embodiments the first linking member 46 is joined to the dashboard lower 19 so as to form a closed cross-section, and the second linking members 47 and 47 are joined to the dashboard lower 19 so as to form a closed cross-section, but a first linking member 46 and second linking members 47 and 47 themselves may be members having a closed cross-section, and they may be linked to a dashboard lower 19.

The invention claimed is:

1. A vehicle comprising:
a vehicle body frame,
a power unit supported on the vehicle body frame,
a floor panel supported on the vehicle body frame,
a wheel operatively attached to the vehicle body frame and having a tire mounted thereon, and a passenger seat disposed above the floor panel, and
an automobile chassis frame structure comprising a plurality of pipe materials arranged and joined to each other to form a frame member which is a component of said vehicle body frame,
wherein in a first portion, on a first end of the frame member situated between the tire and the power unit and configured for supporting one side of the power unit, the plurality of pipe materials extend in a substantially longitudinal direction of the frame structure and are arranged in a first, substantially vertically stacked direction relative to one another, in a second portion, on a second end of the frame member situated below a lower face of the floor panel and below the passenger seat, the plurality of pipe materials extend in the substantially longitudinal direction of the frame structure and are arranged in a second, substantially horizontal side-by-side direction relative to one another, and in a third, intermediate portion sandwiched by the first and second portions of the frame member the arrangement of the plurality of pipe materials relative to one another is changed from the first direction to the second direction,
wherein the plurality of pipe materials are joined to each other in the first and second portions, and are not joined to each other in the third portion,
and wherein the plurality of pipe materials comprise in one portion in a longitudinal direction a changed strength portion that has a strength different from other portions.

2. The vehicle according to claim 1, wherein each of the plurality of pipe materials comprise in one portion in a longitudinal direction a changed strength portion that has a strength different from other portions, and the positions of the changed strength portions coincide with each other in a longitudinal direction of the frame member.

3. The vehicle according to claim 1, wherein at a predetermined position in a longitudinal direction of the frame member, only some pipe materials of the plurality of pipe materials comprise in one portion in a longitudinal direction a changed strength portion that has a strength different from other portions.

4. The vehicle according to claim 1, wherein at least two pipe materials of the plurality of pipe materials comprise in one portion in a longitudinal direction a changed strength portion that has a strength different from other portions, and the changed strength portions of the two pipe materials have different positions in a longitudinal direction of the frame member.

5. The vehicle according to claim 1, wherein the plurality of pipe materials are welded at predetermined pitches, and the pitches for welding are nonuniform in the longitudinal direction of the frame member.

6. The vehicle according to claim 5, wherein the frame member comprises a plurality of weld lines, and the welding pitches of the plurality of weld lines are not coincident with each other.

7. The vehicle according to claim 1, wherein in the first portion or the second portion, a groove-shaped bead is formed in one of mating faces of at least two of the pipe materials, and the bead opens on an outer surface of the frame member in the third portion.

8. The vehicle according to claim 1, wherein of the mating faces of the two pipe materials superimposed in the vertical direction, the bead is formed in a lower face of the upper-side pipe material.

9. The vehicle according to claim 8, wherein an interior of the bead facing the mating face is filled with a rustproofing agent.

10. The vehicle according to claim 7, wherein a groove-shaped bead is formed in one of the mating faces of each of the two pipe materials, respectively, and wherein an opening opposing the bead is formed in the other mating face.

11. The vehicle according to claim 1, wherein the third portion is an inclined portion that is sandwiched between the first and second portions of a front side frame, which is the frame member, and is inclined downwardly to the rear, and the structure comprises a first linking member that has opposite ends in the vehicle width direction connected to a linking part provided on the inclined portion, a second linking member that extends rearwardly from the linking part and is connected to a front pillar lower, and a third linking member that extends upwardly from the linking part and is connected to another frame member.

12. The vehicle according to claim 11, wherein the second and third linking members are linked to the linking part via a joining member that is weaker than the second and third linking members.

13. The vehicle according to claim 11, wherein the other frame member comprises left and right wheel house upper members that extend in a fore-and-aft direction on an outer side in a vehicle width direction of the front side frame.

14. The vehicle according to claim 11, wherein the other frame member comprises left and right wheel house upper members that extend in a fore-and-aft direction on an outer side in a vehicle width direction of the front side frame or a dashboard upper cross member that links the left and right front pillar lowers.

15. The vehicle according to claim 11, wherein the other frame member comprises the front pillar lower.

16. The vehicle according to claim 11, wherein the first and second linking members are formed so as to have a closed cross-section by joining a sheet metal pressed material to a dashboard lower, and the third linking member is formed from a pipe material.

17. The vehicle according to claim 16, wherein the first linking member extends from the linking part inwardly in the vehicle width direction, and the second linking member and the third linking member extend from the linking part outwardly in the vehicle width direction.

18. The vehicle according to claim 17, wherein the inclined portion of the front side frame has a weak portion at a position in front of the linking part, the weak portion being locally weakened.

19. A vehicle comprising:
a vehicle body frame,
a power unit supported on the vehicle body frame,
a floor panel supported on the vehicle body frame,
a wheel operatively attached to the vehicle body frame and having a tire mounted thereon, and a passenger seat disposed above the floor panel, and
an automobile chassis frame structure comprising a plurality of pipe materials arranged and joined to each other to form a frame member which is a component of said vehicle body frame,
wherein in a first portion, on a first end side of the frame member situated between the tire and the power unit and configured for supporting one side of the power unit, the plurality of pipe materials extend in a substantially longitudinal direction of the frame structure and are arranged in a first, substantially vertically stacked direction relative to one another, in a second portion, on a second end of the frame member situated below a lower face of the floor panel and below the passenger seat, the plurality of pipe materials extend in the substantially longitudinal direction of the frame structure and are arranged in a second, substantially horizontal side-by-side direction relative to one another, and in a third, intermediate portion sandwiched by the first and second portions of the frame member the arrangement of the plurality of pipe materials relative to one another is changed from the first direction to the second direction,
wherein the plurality of pipe materials are joined to each other in at least the first and second portions, and are not joined to each other in the third portion,
and wherein the plurality of pipe materials are welded at predetermined pitches, and the pitches for welding are nonuniform in the longitudinal direction of the frame member.

20. The vehicle according to claim 3, wherein the plurality of pipe materials are welded at predetermined pitches, and the pitches for welding are nonuniform in the longitudinal direction of the frame member.

21. The vehicle according to claim 4, wherein the plurality of pipe materials are welded at predetermined pitches, and the pitches for welding are nonuniform in the longitudinal direction of the frame member.

22. A vehicle comprising:
a vehicle body frame,
a power unit supported on the vehicle body frame,
a floor panel supported on the vehicle body frame,
a wheel operatively attached to the vehicle body frame and having a tire mounted thereon, and a passenger seat disposed above the floor panel, and
an automobile chassis frame structure comprising a plurality of pipe materials arranged and joined to each other to form a frame member which is a component of said vehicle body frame,
wherein in a first portion, on a first end side of the frame member situated between the tire and the power unit and configured for supporting one side of the power unit, the plurality of pipe materials extend in a substantially longitudinal direction of the frame structure and are arranged in a first, substantially vertically stacked direction relative to one another, in a second portion, on a second end of the frame member situated below a lower face of the floor panel and below the passenger seat, the plurality of pipe materials extend in the substantially longitudinal direction of the frame structure and are arranged in a second, substantially horizontal side-by-side direction relative to one another, and in a third, intermediate portion sandwiched by the first and second portions of the frame member the arrangement of the plurality of pipe materials relative to one another is changed from the first direction to the second direction,
wherein the plurality of pipe materials are joined to each other in at least the first and second portions, and are not joined to each other in the third portion,
and wherein in the first portion or the second portion, a groove-shaped bead is formed in one of mating faces of at least two of the pipe materials, and the bead opens on an outer surface of the frame member in the third portion.

23. The vehicle according to claim 3, wherein in the first portion or the second portion, a groove-shaped bead is formed in one of mating faces of at least two of the pipe materials, and the bead opens on an outer surface of the frame member in the third portion.

24. The vehicle according to claim 4, wherein in the first portion or the second portion, a groove-shaped bead is formed in one of mating faces of at least two of the pipe materials, and the bead opens on an outer surface of the frame member in the third portion.

25. The vehicle according to claim 12, wherein the other frame member comprises left and right wheel house upper members that extend in a fore-and-aft direction on an outer side in a vehicle width direction of the front side frame.

26. The vehicle according to claim 12, wherein the other frame member comprises left and right wheel house upper members that extend in a fore-and-aft direction on an outer side in a vehicle width direction of the front side frame or a dashboard upper cross member that links the left and right front pillar lowers.

27. The vehicle according to claim 12, wherein the other frame member comprises the front pillar lower.

28. The vehicle according to claim 12, wherein the first and second linking members are formed so as to have a closed cross-section by joining a sheet metal pressed material to a dashboard lower, and the third linking member is formed from a pipe material.

* * * * *